Figure 2:
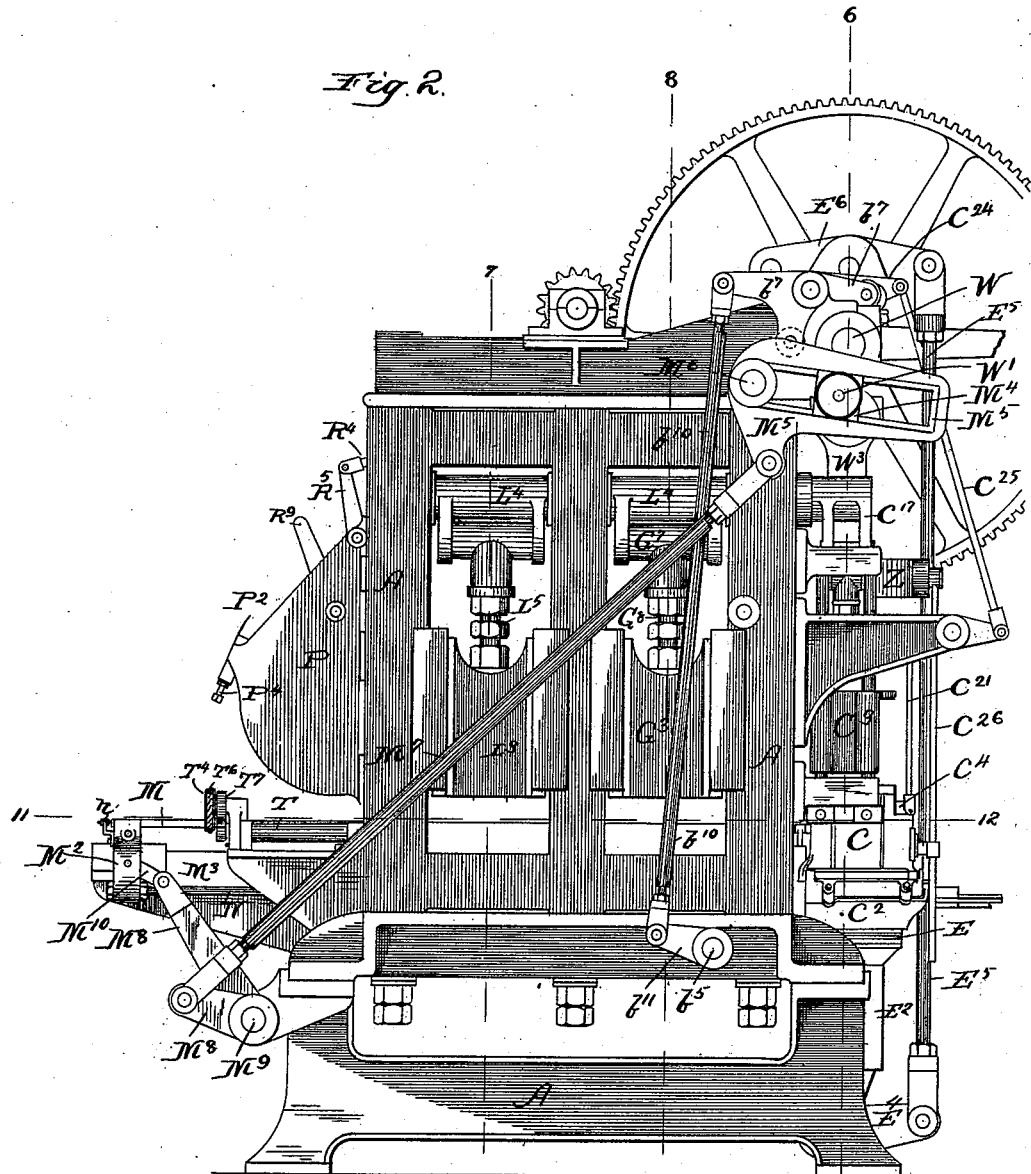

(No Model.) 20 Sheets—Sheet 1.

F. M. LEAVITT & J. G. HODGSON.
CAN BODY FORMING MACHINE.

No. 522,261. Patented July 3, 1894.

Fig. 1.

Witnesses:
Geo. E. Curtis
Emma Hack

Inventors:
John G. Hodgson
Frank M. Leavitt
by Munday Evarts
& Adcock
their Attorneys.

THE NORRIS PETERS CO., PHOTO-LITHO., WASHINGTON, D. C.

(No Model.) 20 Sheets—Sheet 2.
F. M. LEAVITT & J. G. HODGSON.
CAN BODY FORMING MACHINE.

No. 522,261. Patented July 3, 1894.

(No Model.) 20 Sheets—Sheet 6.

F. M. LEAVITT & J. G. HODGSON.
CAN BODY FORMING MACHINE.

No. 522,261. Patented July 3, 1894.

Witnesses:
Lew. C. Curtis
Emma Hark

Inventors:
John G. Hodgson
Frank M. Leavitt

By Munday Evarts & Adcock
their Attorneys (No Model.) 20 Sheets—Sheet 7.

F. M. LEAVITT & J. G. HODGSON.
CAN BODY FORMING MACHINE.

No. 522,261. Patented July 3, 1894.

(No Model.) 20 Sheets—Sheet 8.

F. M. LEAVITT & J. G. HODGSON.
CAN BODY FORMING MACHINE.

No. 522,261. Patented July 3, 1894.

Witnesses:
Geo. E. Curtis
Emma Hart

Inventors:
John G. Hodgson
Frank M. Leavitt
By Munday Evarts & Adcock
their Attorneys (No Model.) 20 Sheets—Sheet 9.

F. M. LEAVITT & J. G. HODGSON.
CAN BODY FORMING MACHINE.

No. 522,261. Patented July 3, 1894.

Witnesses:
Geo. E. Curtis
Emma Hack

Inventors:
John G. Hodgson &
Frank M. Leavitt
By Munday Evarts & Adcock
their Attorneys.

(No Model.) 20 Sheets—Sheet 10.

F. M. LEAVITT & J. G. HODGSON.
CAN BODY FORMING MACHINE.

No. 522,261. Patented July 3, 1894.

Witnesses:
Geo. C. Curtis
Emma Stack

Inventors:
John G. Hodgson
Frank M. Leavitt
by Munday,
Evarts &
Adcock
their Attorneys.

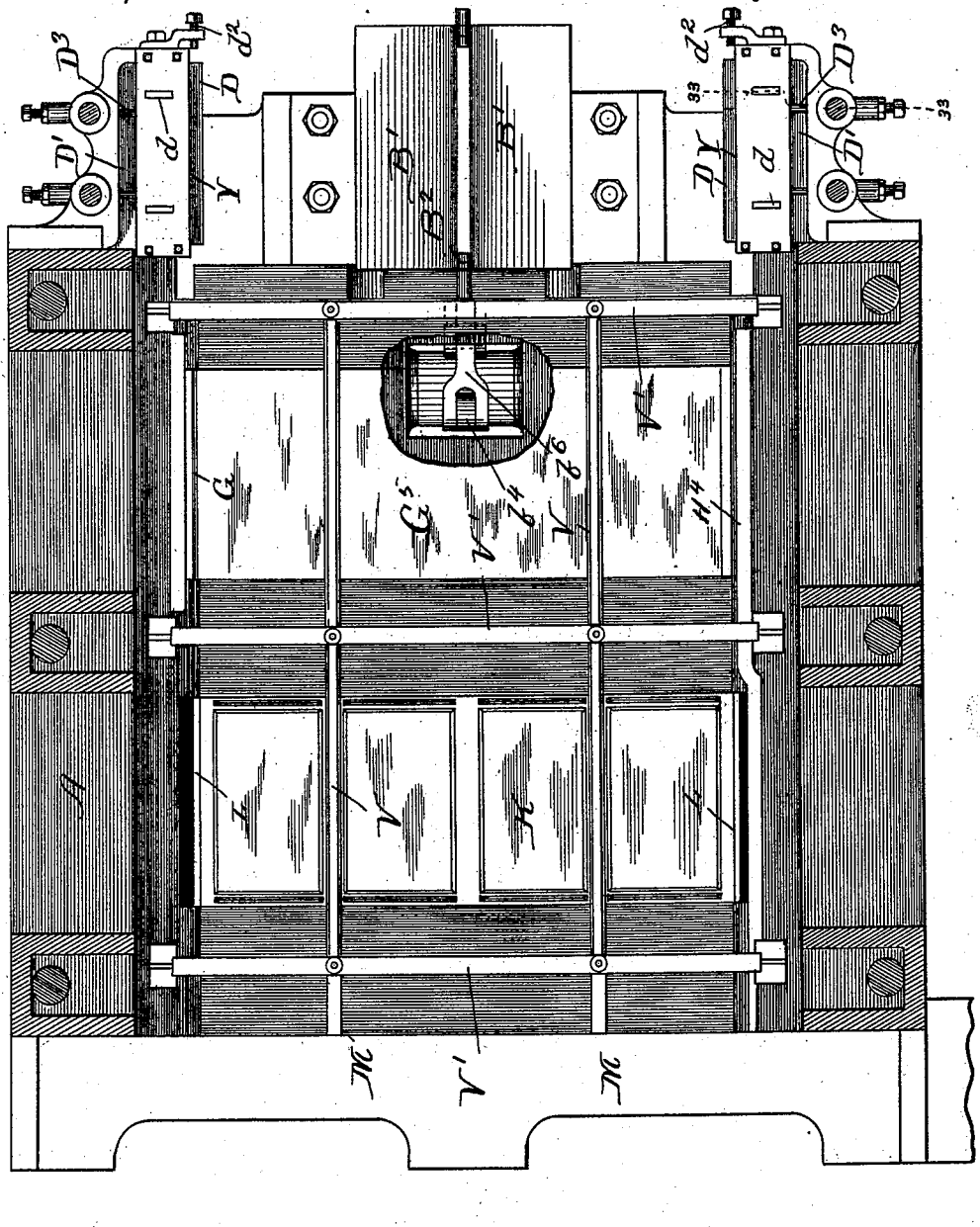

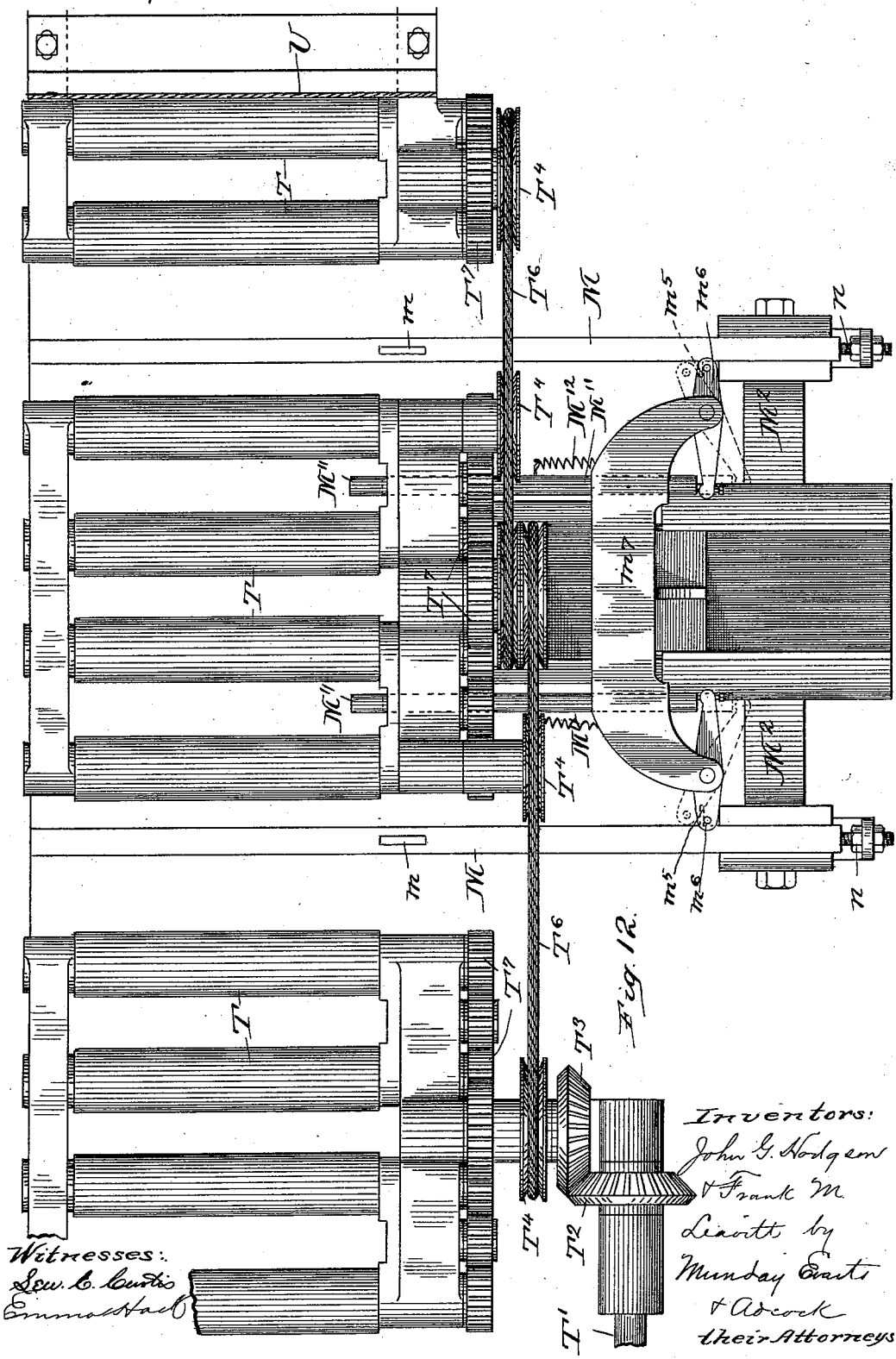

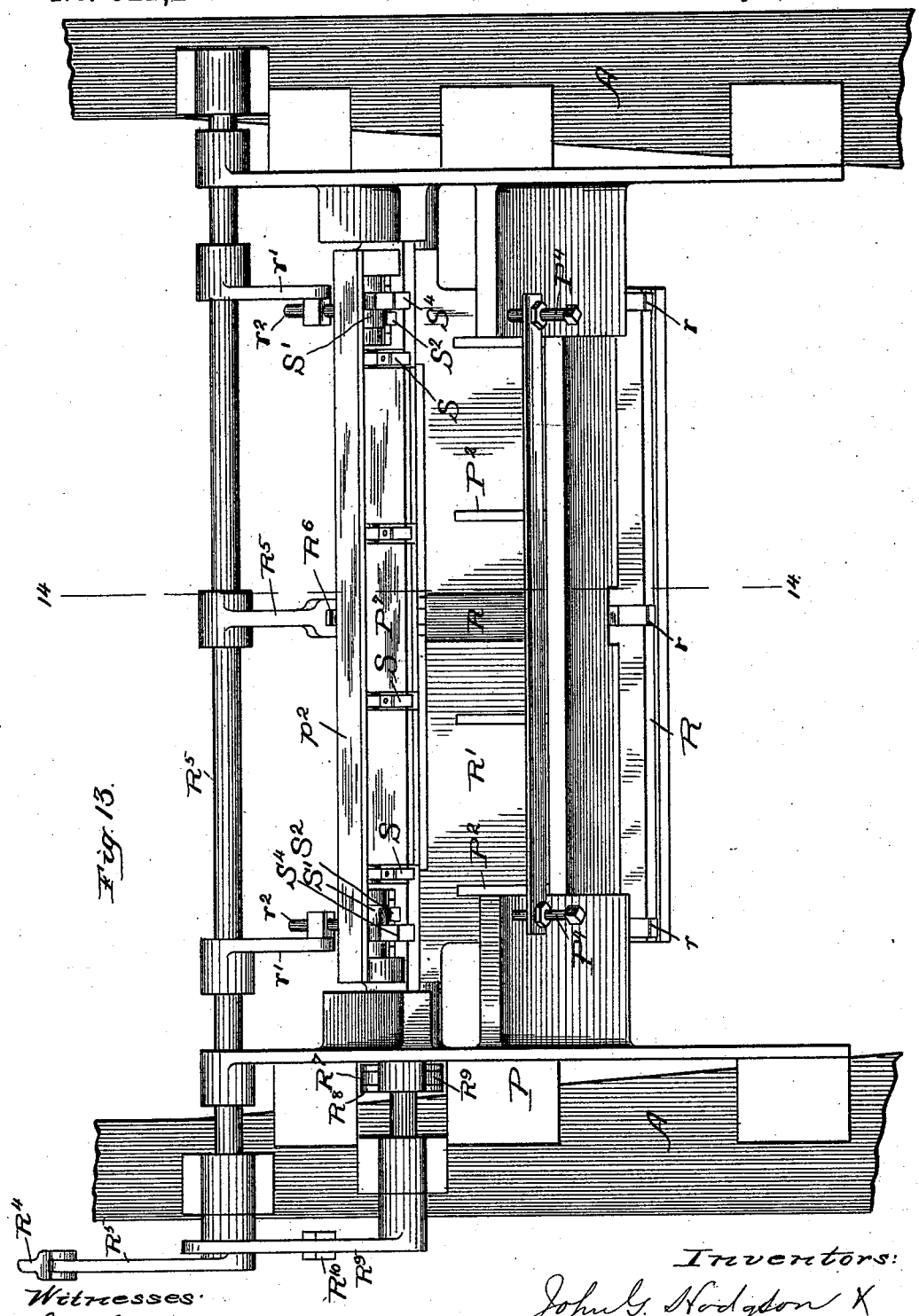

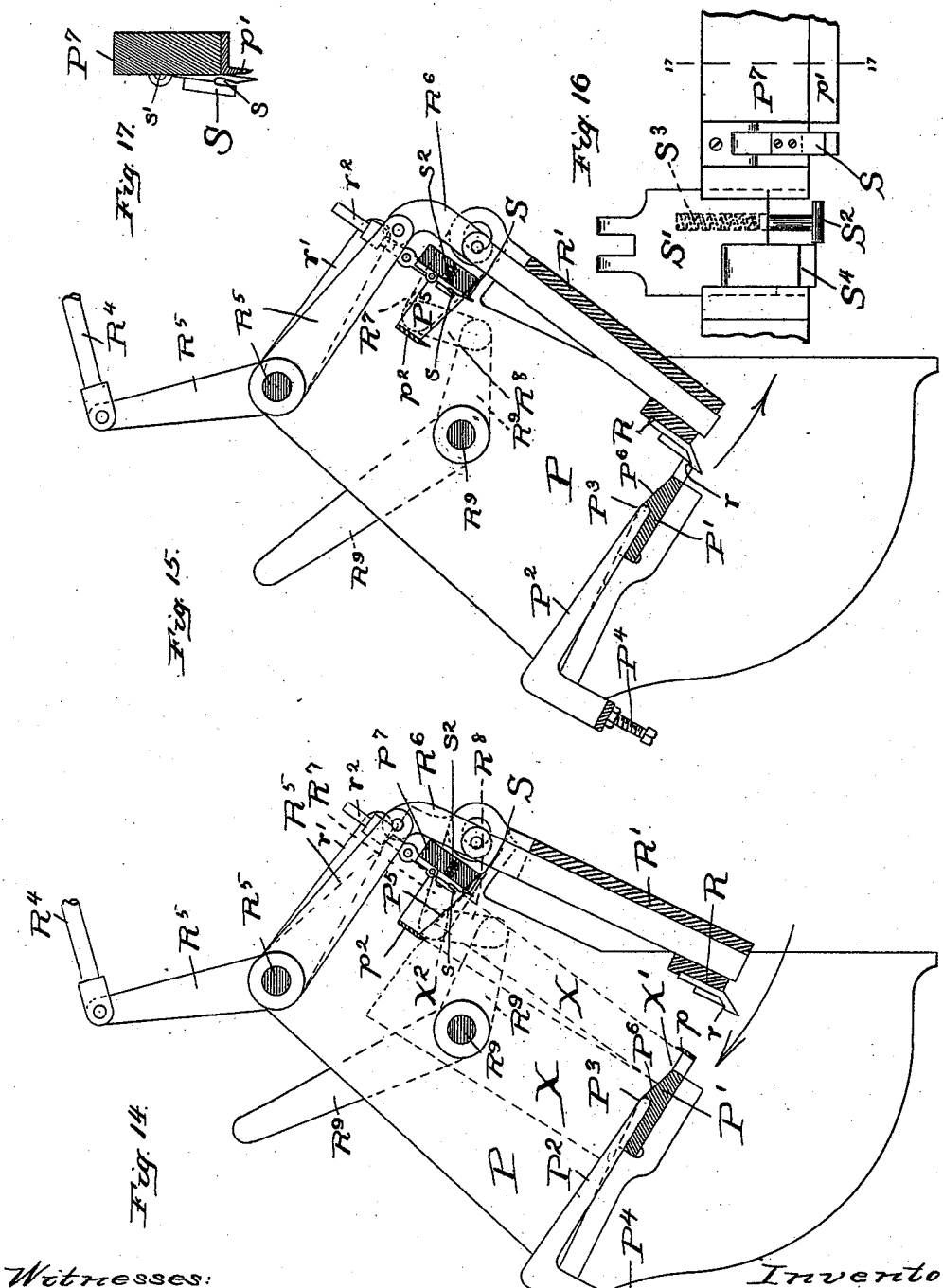

(No Model.)  20 Sheets—Sheet 15.

F. M. LEAVITT & J. G. HODGSON.
CAN BODY FORMING MACHINE.

No. 522,261.  Patented July 3, 1894.

Witnesses:
Sew. E. Curtis
Emma Staib

Inventors:
John G. Hodgson
& Frank M. Leavitt
By Munday Evarts & Adcock
their Attorneys (No Model.) 20 Sheets—Sheet 16.
F. M. LEAVITT & J. G. HODGSON.
CAN BODY FORMING MACHINE.
No. 522,261. Patented July 3, 1894.
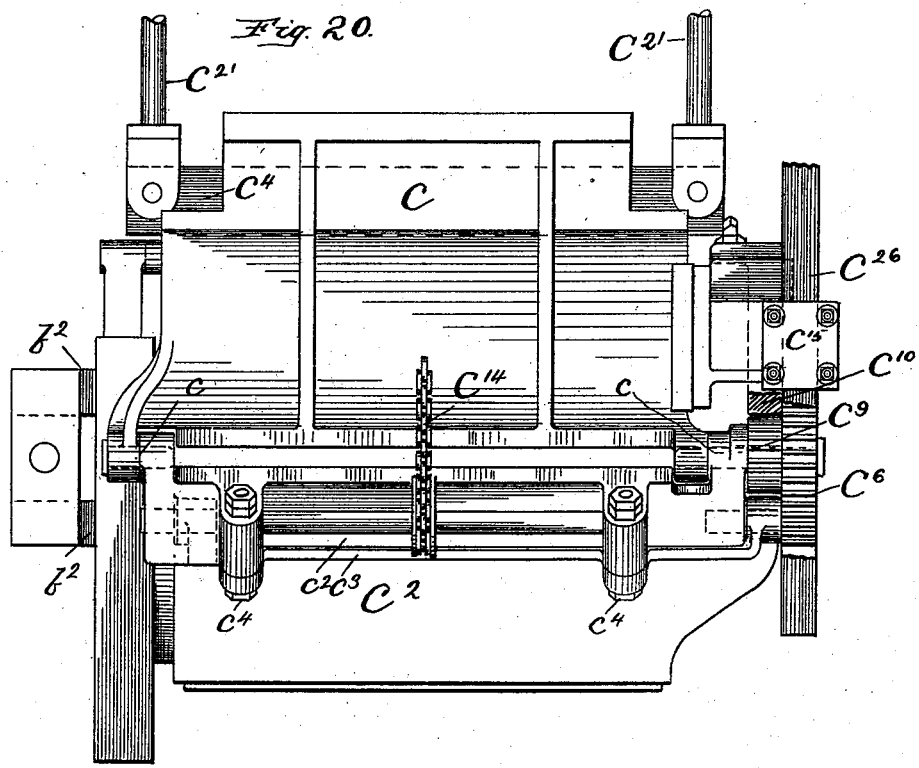
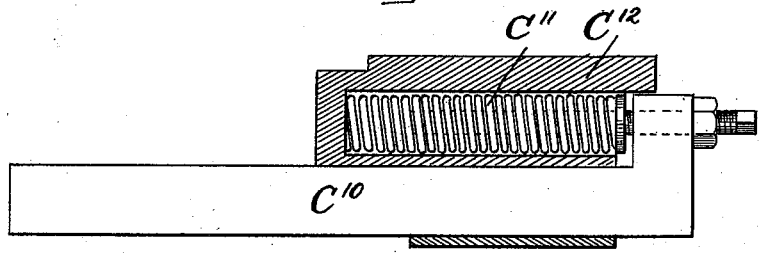
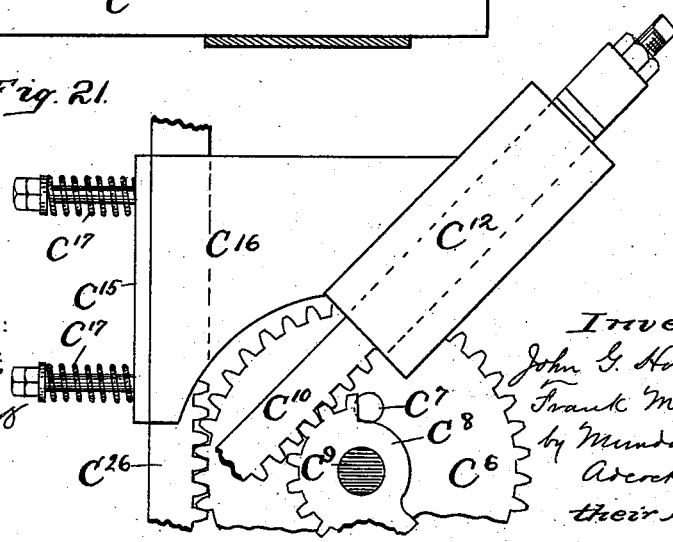
THE NORRIS PETERS CO., PHOTO-LITHO., WASHINGTON, D. C.

(No Model.) 20 Sheets—Sheet 17.
F. M. LEAVITT & J. G. HODGSON.
CAN BODY FORMING MACHINE.
No. 522,261. Patented July 3, 1894.
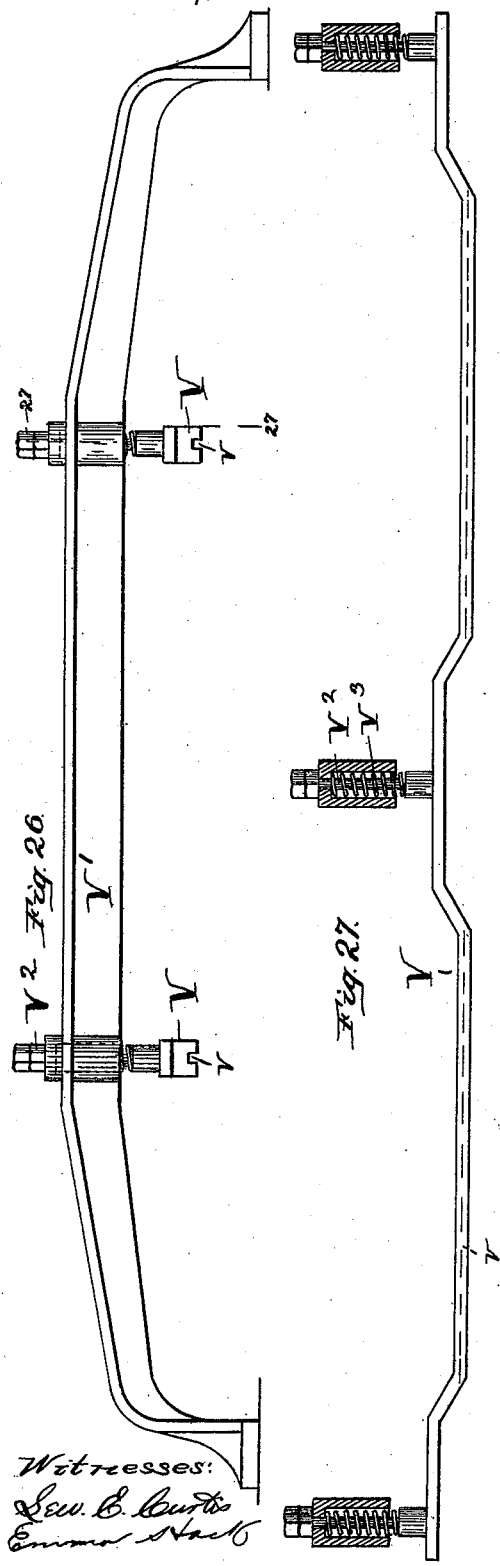
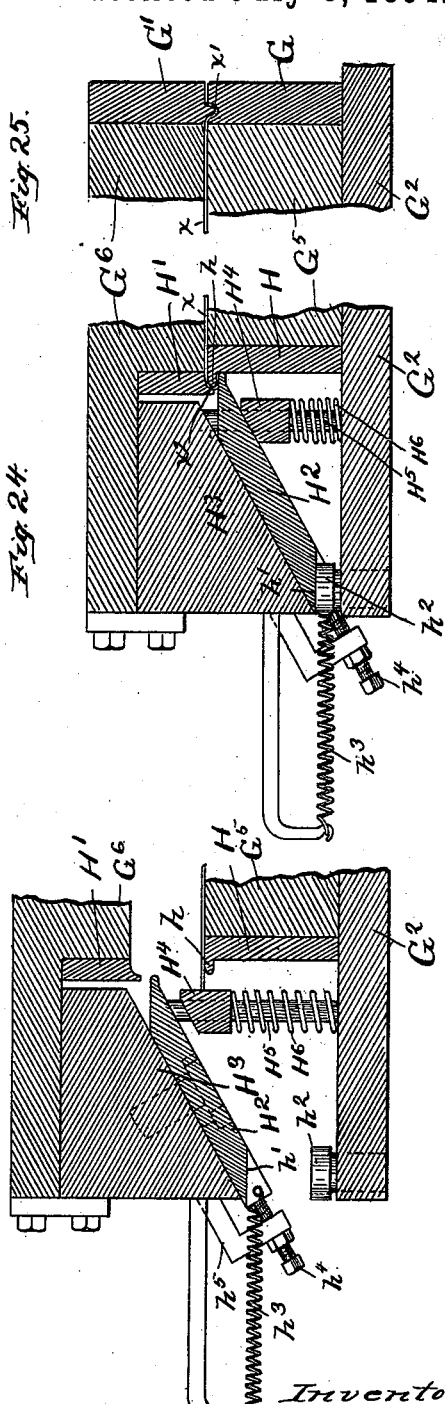
Witnesses:
Geo. E. Curtis
Emma Hack
Inventors:
John G. Hodgson &
Frank M. Leavitt
By Munday Evarts & Adcock
their Attorneys.

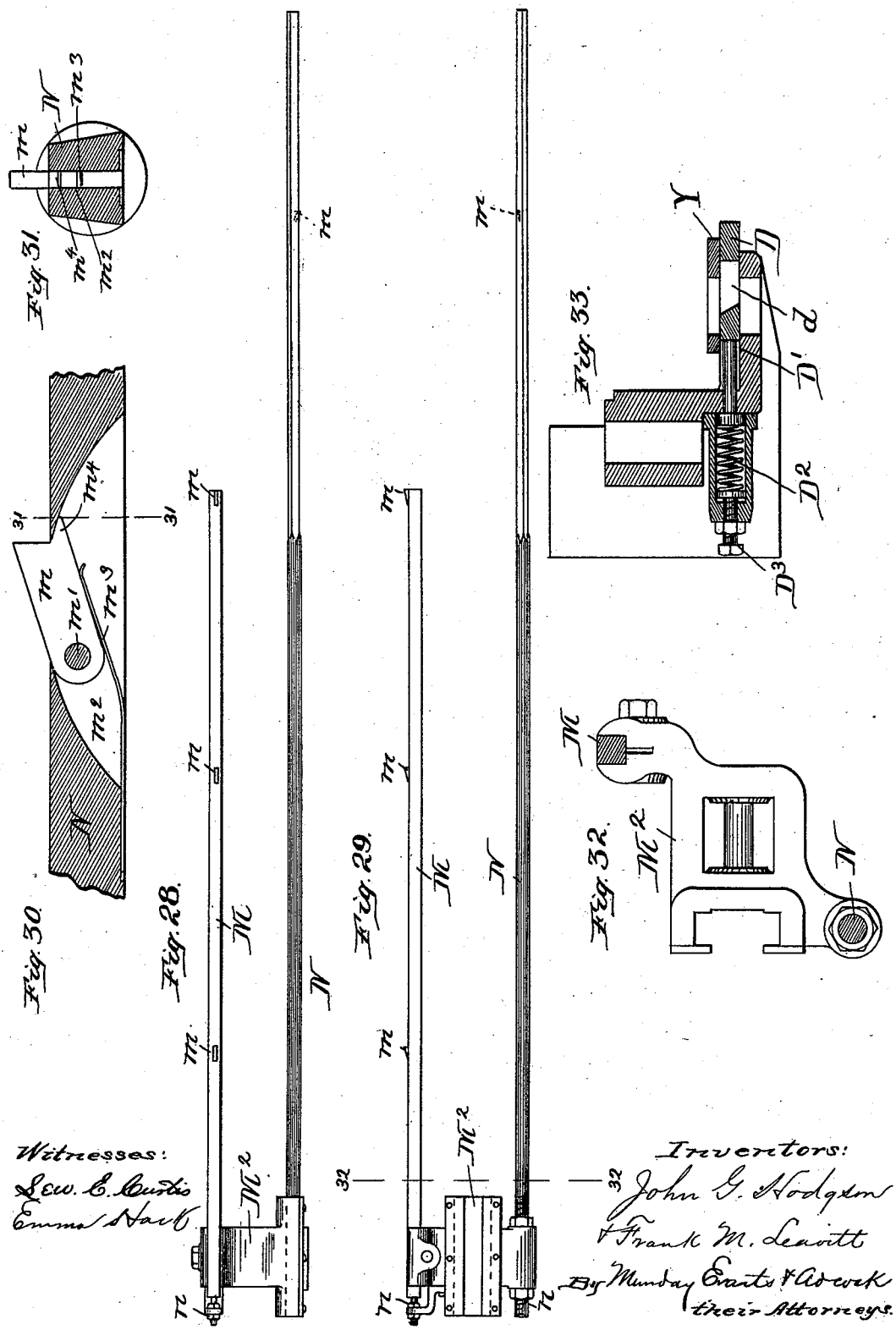

(No Model.) 20 Sheets—Sheet 19.
F. M. LEAVITT & J. G. HODGSON.
CAN BODY FORMING MACHINE.
No. 522,261. Patented July 3, 1894.
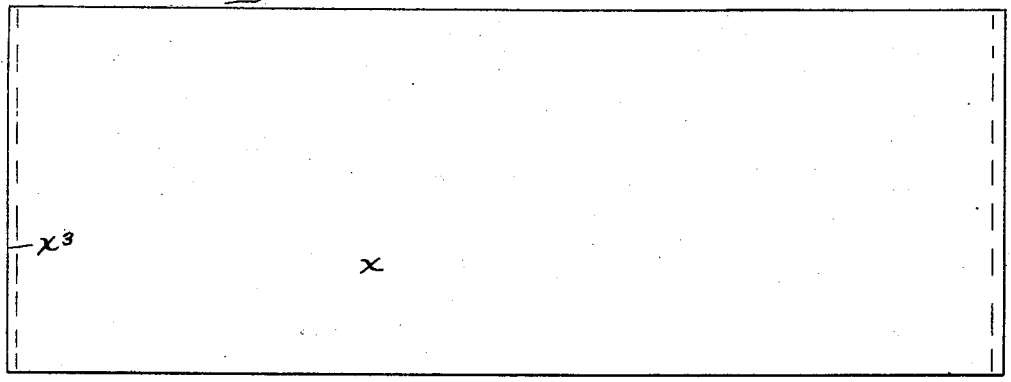
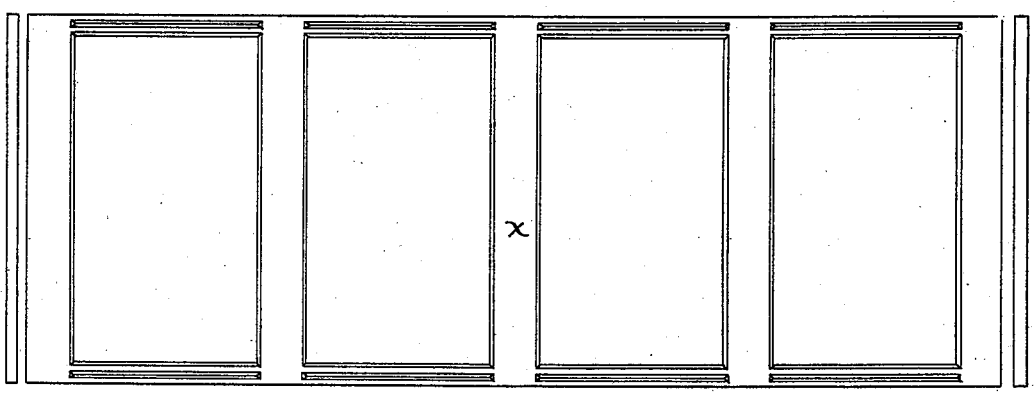
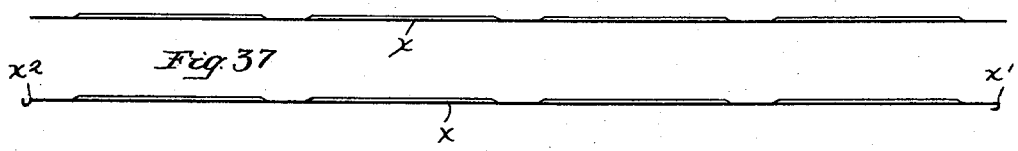
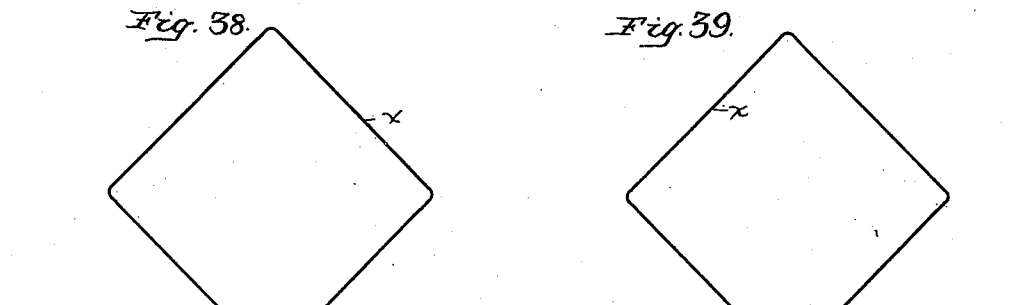
Witnesses:
Sew. E. Curtis
Emma Hack
Inventors:
John G. Hodgson &
Frank M. Leavitt
By Munday Evarts & Adcock
their Attorneys.

(No Model.) 20 Sheets—Sheet 20.
F. M. LEAVITT & J. G. HODGSON.
CAN BODY FORMING MACHINE.
No. 522,261. Patented July 3, 1894.
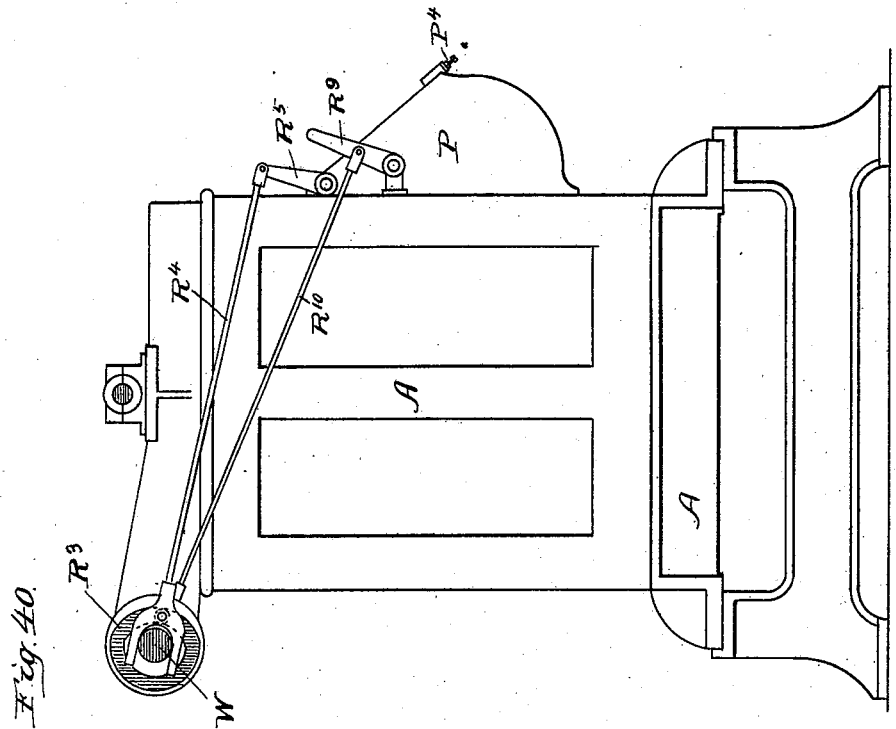

UNITED STATES PATENT OFFICE.

FRANK M. LEAVITT, OF BROOKLYN, NEW YORK, AND JOHN G. HODGSON, OF MAYWOOD, ILLINOIS, ASSIGNORS TO EDWIN NORTON, OF MAYWOOD, AND OLIVER W. NORTON, OF CHICAGO, ILLINOIS.

CAN-BODY-FORMING MACHINE.

SPECIFICATION forming part of Letters Patent No. 522,261, dated July 3, 1894.

Application filed September 27, 1892. Renewed March 15, 1894. Serial No. 503,562. (No model.)

*To all whom it may concern:*

Be it known that we, FRANK M. LEAVITT, residing in Brooklyn, in the county of Kings and State of New York, and JOHN G. HODGSON, residing in Maywood, in the county of Cook, in the State of Illinois, citizens of the United States, have invented a new and useful Improvement in Can-Body-Forming Machines, of which the following is a specification.

Our invention relates to machines for making can bodies.

The object of our invention is to provide an automatic machine to feed the blanks one by one from the pile or stack of blanks, trim the edges, which are to be folded together, of the blanks, produce the requisite panels or corrugations required in the sides of the can body, produce edge folds or hooks at the meeting edges of the blank, form up the can body to the required shape and interlock such edge folds or hooks, close or squeeze the seam, and finally, discharge the completed can body from the machine.

A further object is to provide a machine for automatically making the bodies of petroleum cans, the same being large square cans of about five gallons capacity and having paneled sides.

Our invention consists, in connection with a can body former horn and a device for folding the blank around the horn to form the can body, the edge folding or hook forming devices and a blank feed device, of a device for trimming the edges of the sheet before the hooks or edge folds are formed thereon.

It further consists, in connection with these parts, of dies or devices for forming the panels in the blank, the paneling dies being preferably operated by the same means and simultaneously with the edge trimming devices or dies.

Our invention further consists, in connection with the blank feed device by which the blanks are fed one by one from the pile, of a reciprocating blank feeder or carrier operating to receive the blanks as they are delivered from the pile and carry them to the edge trimming, paneling, edge folding and body forming devices.

It also consists, in connection with the devices just above mentioned, of a device for adjusting the position of the sheet or blank in respect to the carrier or feeder device by which it is conveyed to the trimming and paneling dies, edge folding and body forming devices.

It also consists, in connection with the horn and devices for folding or bending the blank around the horn, of a guide for the edge of the sheet to abut against as it is being swung or bent around the horn by the body forming or folding devices.

It also consists in the novel construction of the horn and of the devices for folding the blank around the horn and hereinafter more particularly described.

It also consists in the novel construction of the parts and devices and in the novel combinations of parts and devices herein shown and described and more particularly pointed out in the claims.

In the accompanying drawings, which form a part of this specification, and in which similar letters of reference indicate like parts, we have shown a machine embodying our invention, the same being a machine specially designed for the manufacture of petroleum cans. This machine exhibits one good form for practicing our invention, and that which we believe to be the best form now known to us. It will, however, be obvious to those skilled in the art, that our invention may be embodied in machines of various constructions, and that the construction of the machine shown in the drawings may be widely varied in many of its parts and devices, and especially so varied in the mechanism for operating or imparting the necessary movements to the several operative devices by which the different steps are performed.

Figure 3:
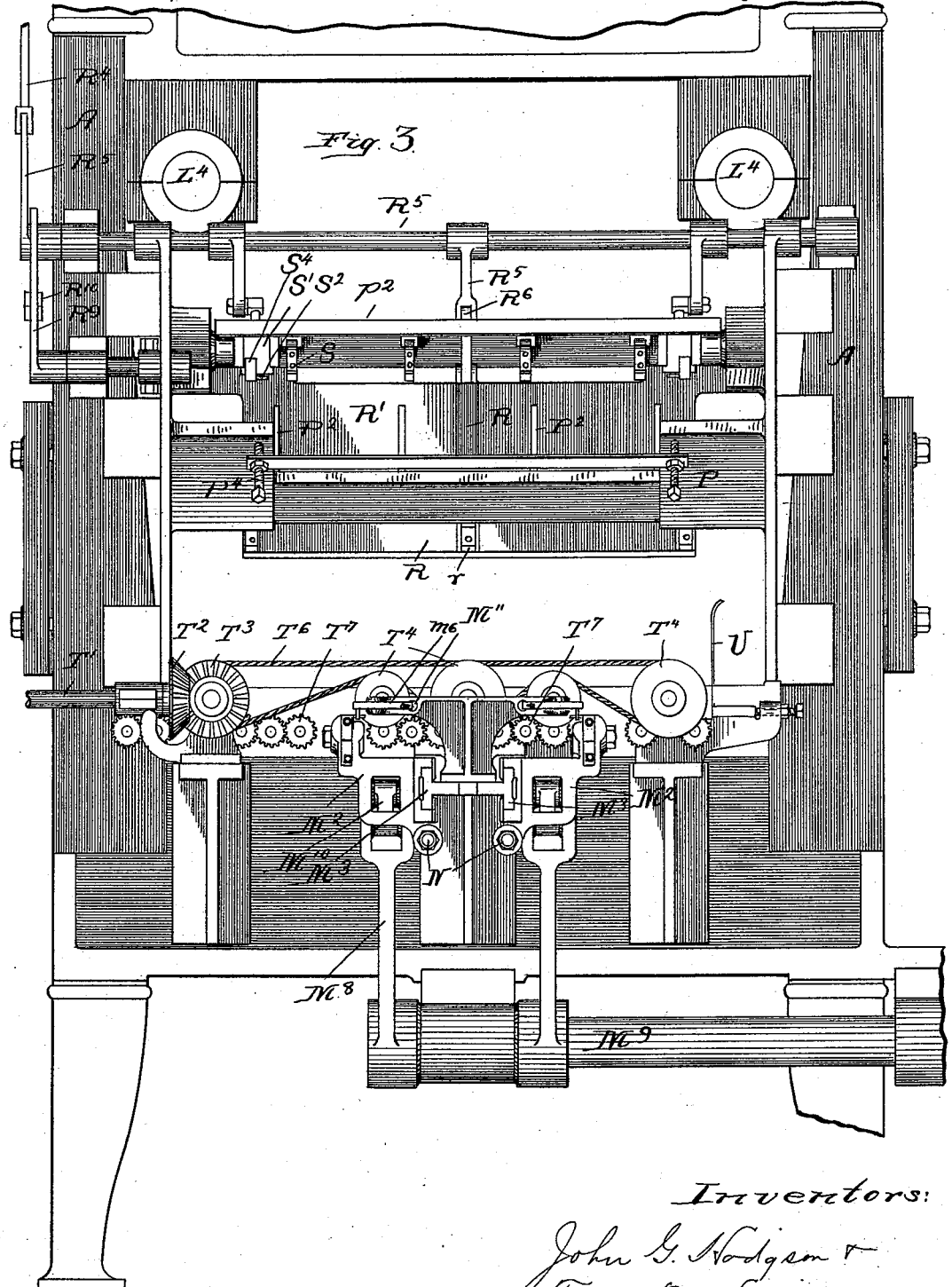
Figure 4:
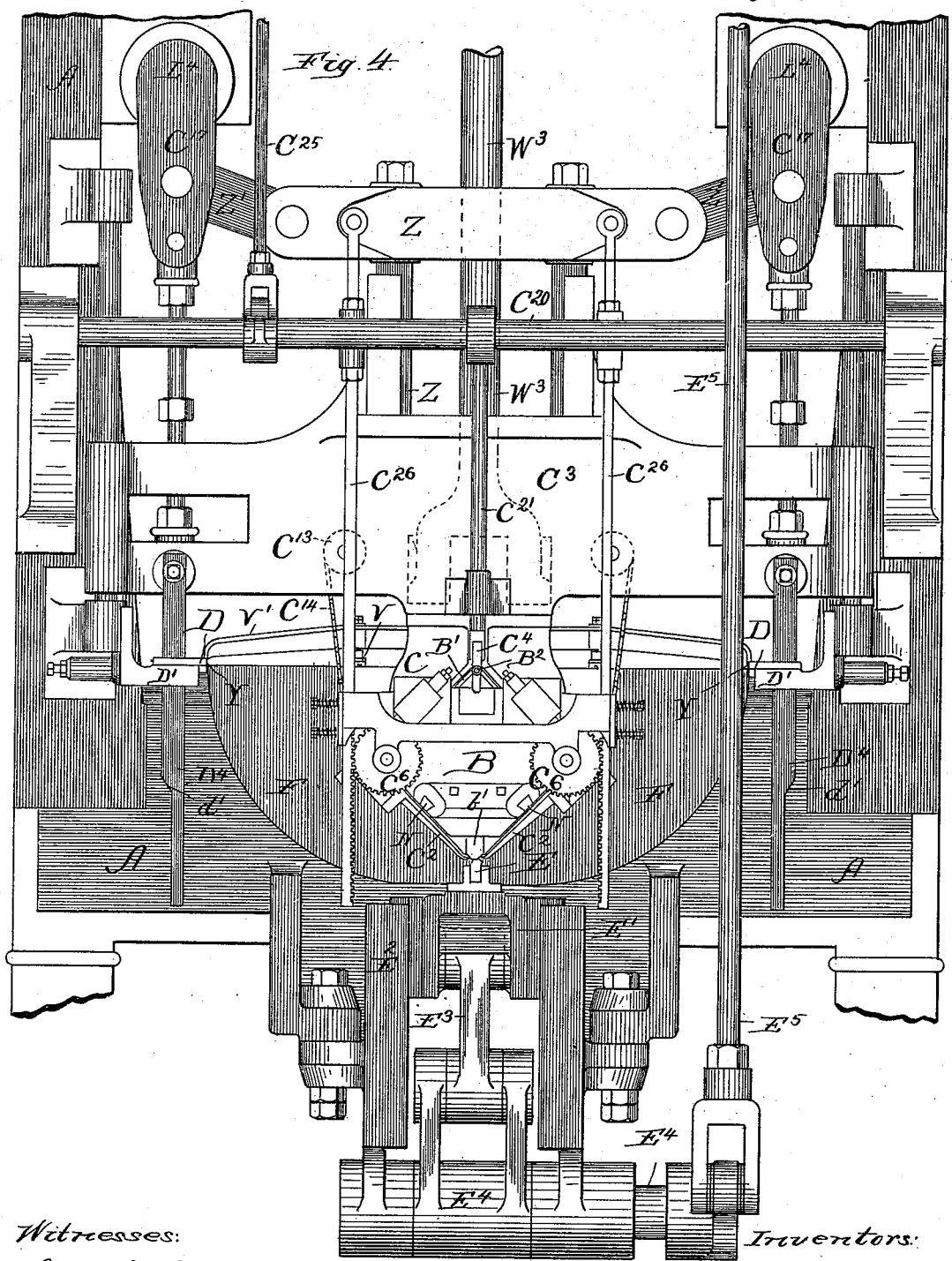
Figure 5:
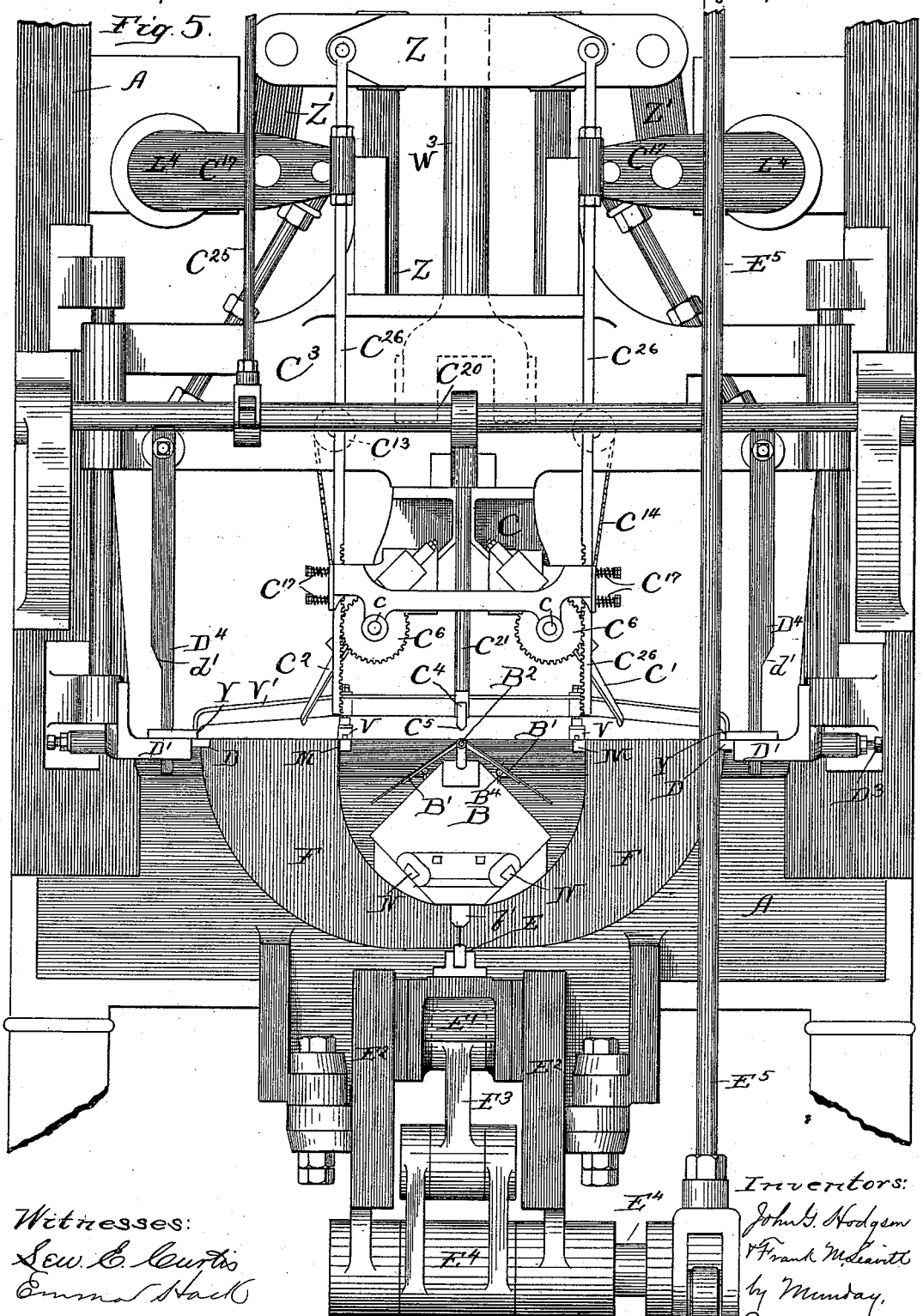
Figure 6:
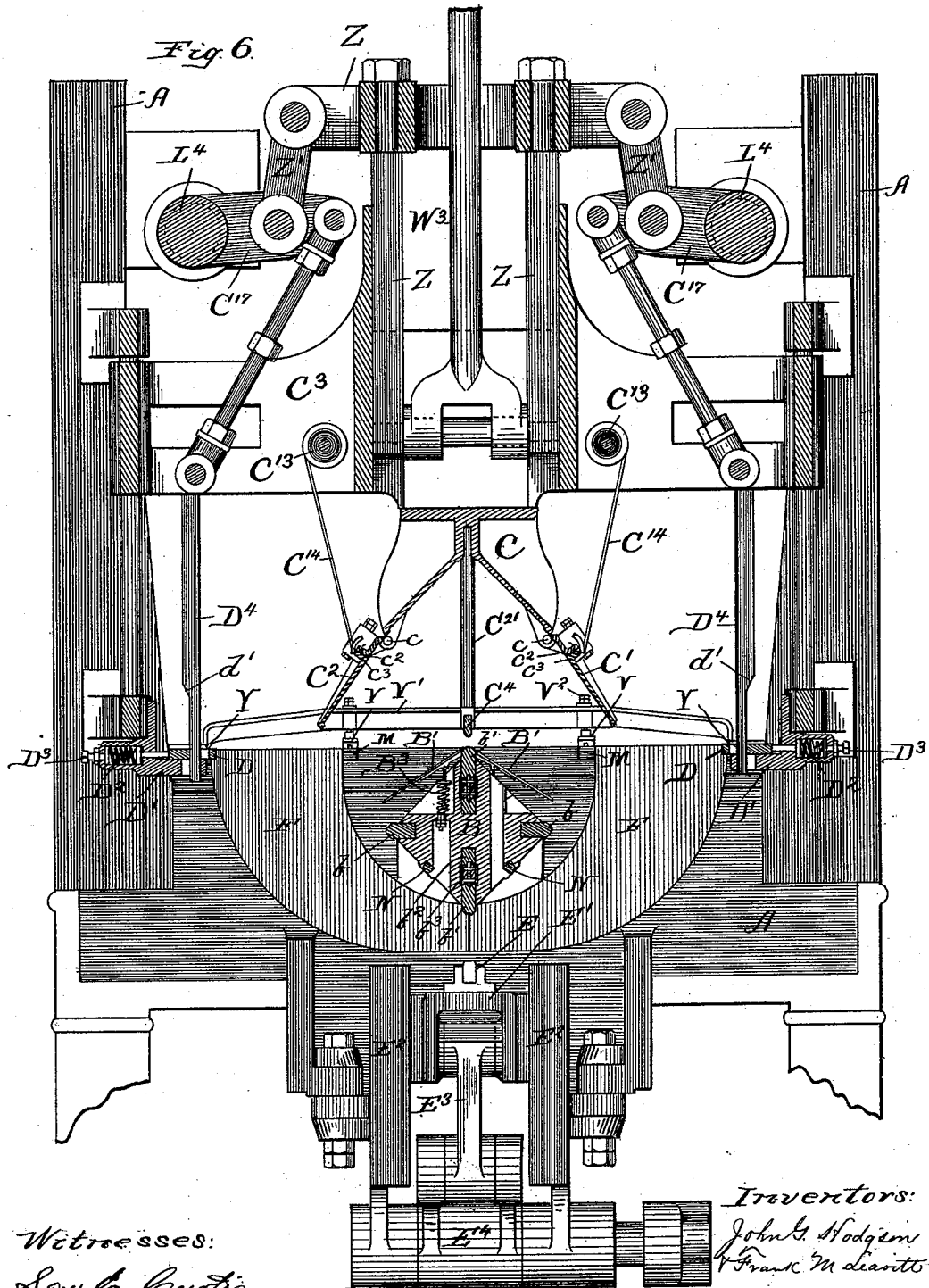
Figure 7:
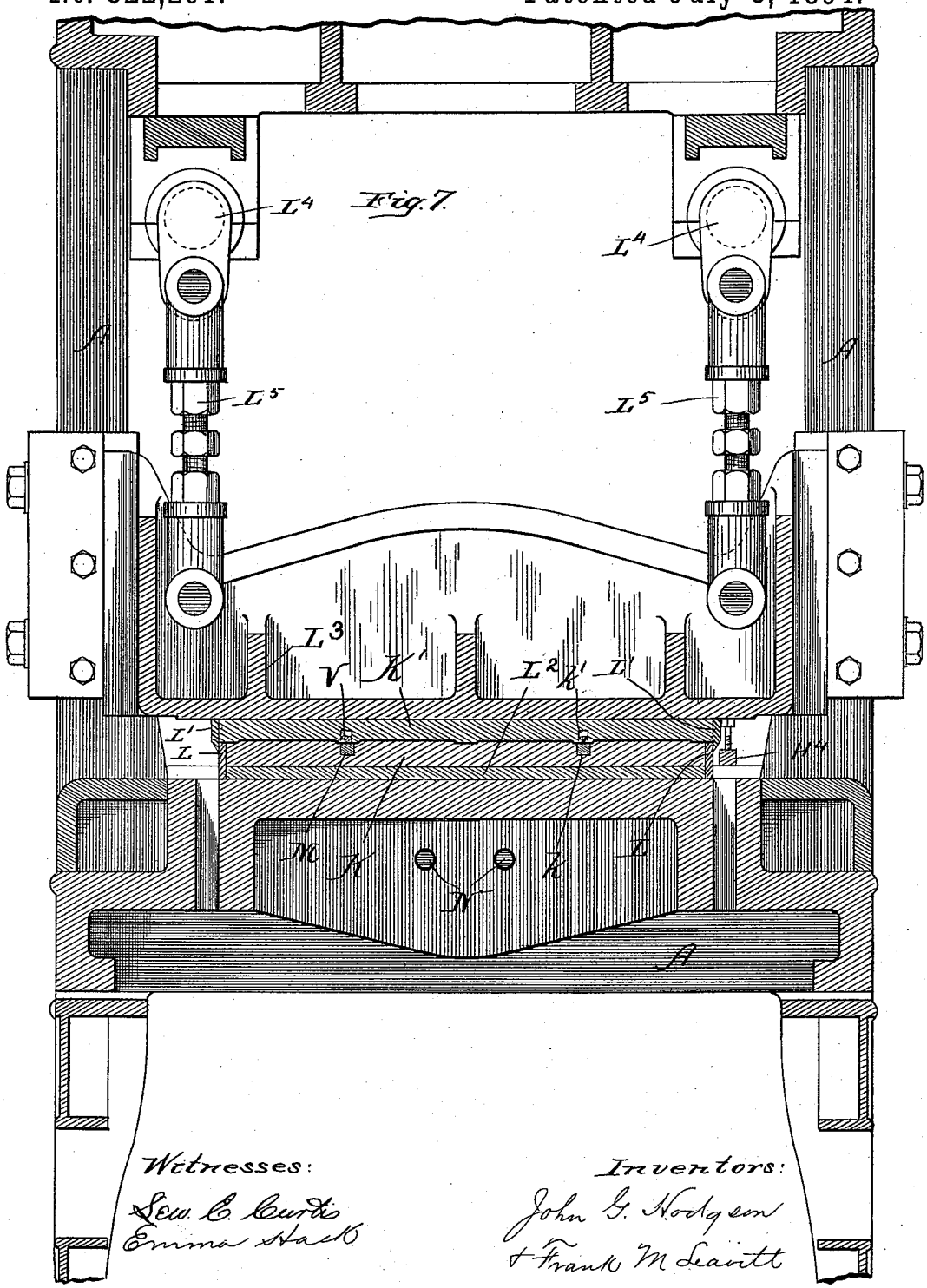
Figure 8:
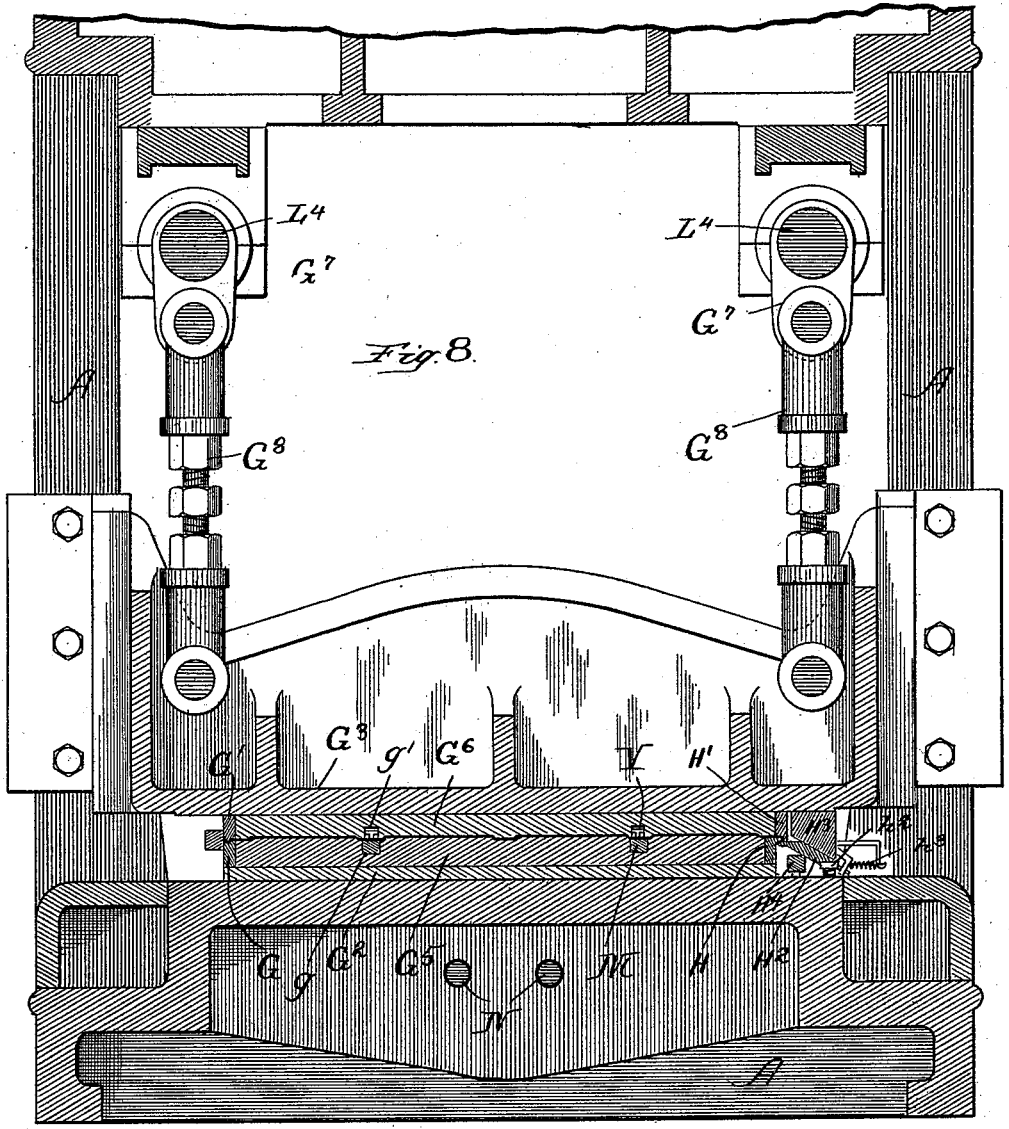
Figure 9:
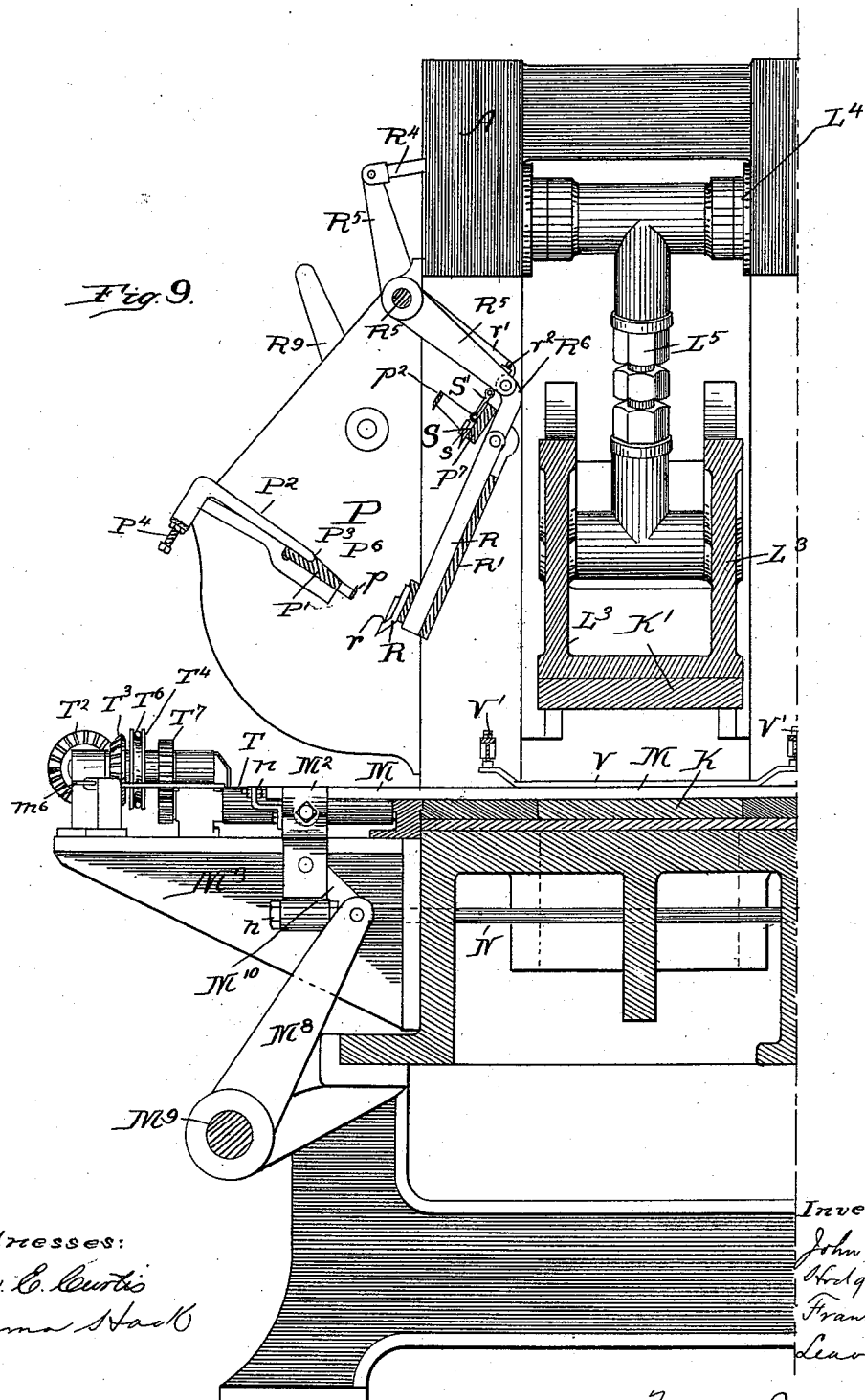
Figure 10:
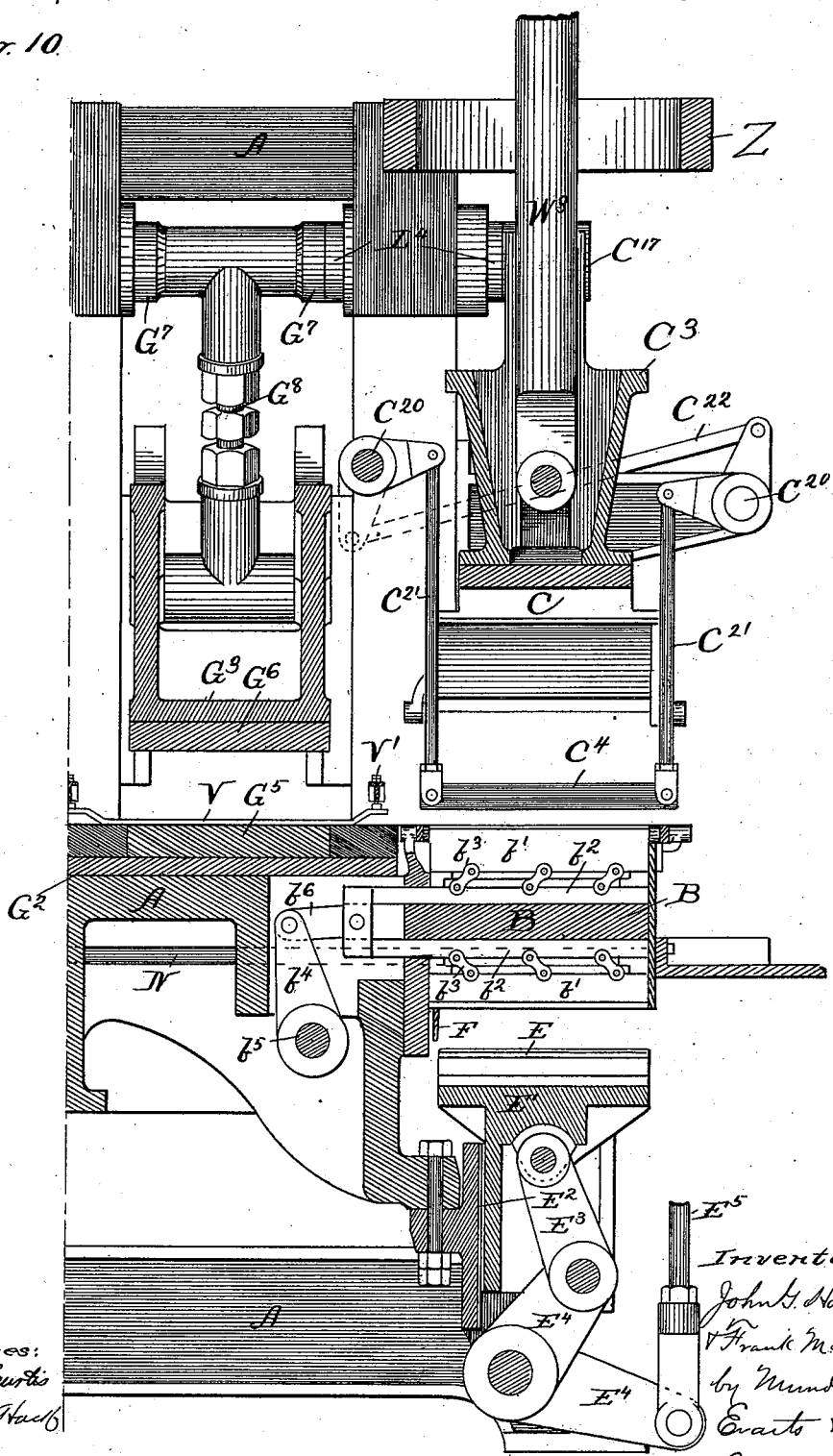
Figure 18:
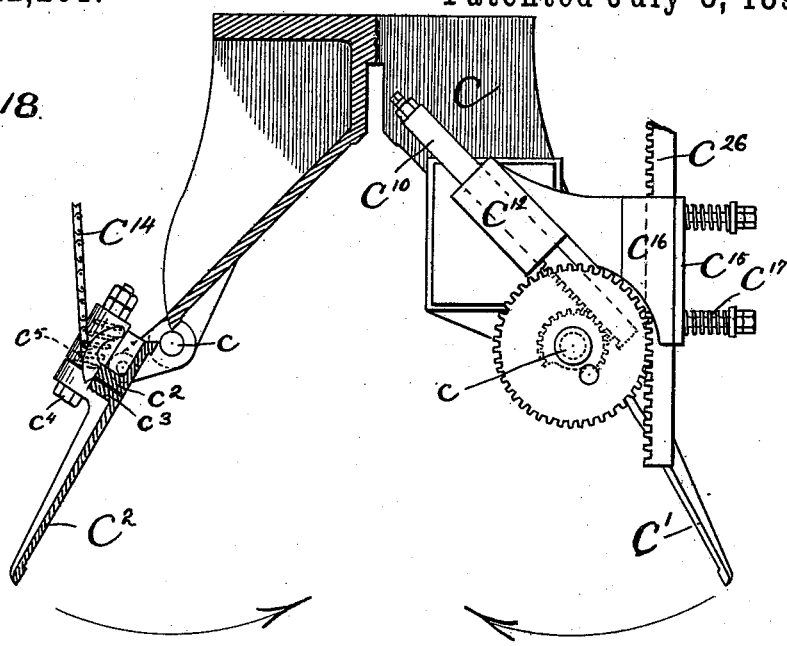
Figure 19:
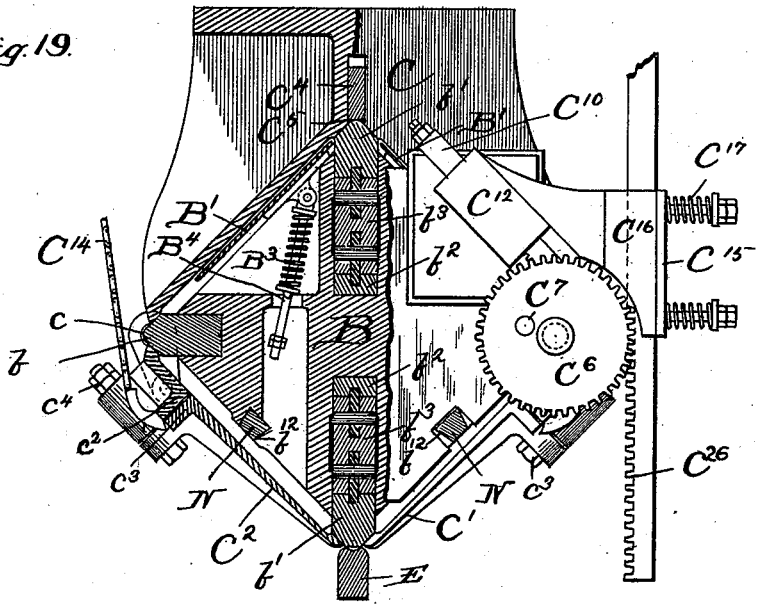

In the drawings, Figure 1 is a rear elevation of the machine; Fig. 2 a side elevation; Fig. 3 a front elevation, enlarged; Fig. 4 a partial rear elevation, enlarged; Fig. 5 a view similar to Fig. 4 showing the body forming or folding devices retracted from the horn. Fig. 6 is a section on line 6—6 of Fig. 2, and showing a vertical cross section of the horn and folders. Fig. 7 is a vertical cross section on line 7—7 of Fig. 2 and showing the edge trimming dies and the paneling dies. Fig. 8 is a vertical cross section on line 8—8 of Fig. 2, and showing the edge folding or hook forming dies or devices. Figs. 9 and 10, taken together, are a vertical longitudinal section on line 9—10 of Fig. 1. Figs. 11 and 12, taken together, are a horizontal section on line 11—12 of Fig. 2. Fig. 13 is a front view of the blank feeder, the device by which the blanks are fed one by one from the pile or stack. Figs. 14 and 15 are sections on line 14—14 of Fig. 13, the two figures showing the parts in different positions. Fig. 16 is a detail elevation of the blank separator and extractor devices of the feeder. Fig. 17 is a section on line 17—17 of Fig. 16. Fig. 18 is an enlarged detail view of the folder or former device by which the blank is bent or folded around the horn, the same being partly in section; and Fig. 19 is a similar view showing the folder in position around the horn. Fig. 20 is a side elevation of the folder. Fig. 21 is a detail view of the rack and gear for operating the hinged wing of the folder. Fig. 22 is a detail view, partly in section, of the spring and rack of the folder. Figs. 23, 24 and 25 are detail cross sectional views of the edge folders, Figs. 23 and 24 showing one edge folder in different positions, and Fig. 25 showing the other edge folder by which a somewhat different shaped hook is made at the opposite edge of the blank. Fig. 26 is an end view of the pressure bars for holding the blank down as it is carried forward by the reciprocating bars or carrier which convey it to the paneling and trimming dies, to the edge folding or hook forming dies, and to the horn. Fig. 27 is a section on line 27—27 of Fig. 26, showing one of the pressure bars in elevation. Fig. 28 is a plan and Fig. 29 a side elevation of one set of the reciprocating blank carrier bars. Fig. 30 is a detail vertical longitudinal section of one of the blank carrier bars showing its pawl for pushing the blank forward. Fig. 31 is a cross section on line 31—31 of Fig. 30. Fig. 32 is a cross section on line 32—32 of Fig. 29. Fig. 33 is a detail sectional view taken on line 33—33 of Fig. 11, and showing the movable support or guide by which the sheet is supported above the horn preparatory to the body folding or forming operation and which moves out of the way of the blank to permit it to be folded downward around the horn. Fig. 34 is a plan view of the blank out of which the can body is to be formed. Fig. 35 shows the same after it has been paneled and trimmed by the paneling and edge trimming dies. Fig. 36 is an edge view of the same. Fig. 37 shows the same after the edge folds or hooks have been formed. Fig. 38 shows the same after it is bent or formed around the horn and the hooks interlocked, and Fig. 39 shows the same after the interlocked hooks have been closed or squeezed together to form the seam, thus completing the can body ready for soldering its side seam. Fig. 40 is a detail view of parts hereinafter described.

In the drawings A represents the frame of the machine.

B is the horn about which the can body blanks $x$ are folded.

C is the former or folder device by which the blank is bent or folded around the horn and its hooks or edge folds interlocked.

D D are the movable supports or guides for supporting the sheet above the horn and which are moved out of the way to permit the sheet to be folded downwardly around the horn.

E is the seam closing or squeezing device by which the interlocked hooks or edge folds are closed together into a seam.

F is the guide against which one side edge of the blank abuts as the blank is swung or bent downward around the horn.

G, G' and H, H', H² are the edge folding or hook forming dies or devices.

K, K' are the paneling dies or devices.

L, L' are the edge trimming dies or devices.

M, N, is the reciprocating blank carrier consisting, preferably, of parallel bars furnished with spring pawls $m$ by which the blanks are pushed or fed forward to the paneling and trimming dies, to the edge folding or hook forming dies, to the horn, and the finished can body finally discharged from the horn.

P is the blank holder in which a pile or stack X of can body blanks $x$ are placed and from which they are fed one by one by a feeder R operating in conjunction with a movable safeguard or separator device S.

T is a blank adjusting device which receives the blanks as they are delivered from the feeder R and moves or adjusts them against a gage U in proper position to be moved forward by the reciprocating blank carrier M, N.

In operation the blanks $x$ are fed, one by one, from the pile of blanks X by the feeder R and delivered onto the blank adjusting device T which moves the sheet lengthwise until one of its end edges abuts against the guide U; and then a reciprocating blank carrier M moves the blank forward horizontally in a direction at right angles to its former movement into position between the edge trimming dies L L' and the paneling dies K K', where the edges of the blank are trimmed and the panels, required in the completed can body, formed therein. The part M of the feeder then moves the blank forward in position to be operated upon by the edge folding dies G, G' and H, H', H². The blank carrier M then moves the blank forward over the horn B, it being at this time supported by the movable guides or supports D D. The folder C then folds or laps the blank downward around the horn and interlocks its hooks $x'$ $x^2$. The seam closer or squeezing device E then moves upward and closes the seam against the horn. The reciprocating blank carrier or feeder N then pushes the can body off of the horn, thus discharging the finished product from the machine. As the blank $x$ is moved forward by the reciprocating carrier M, it is held flat down upon the carrier bars by guide or pressure bars V.

So far as the general principle and the broad or generic features of our invention and its leading combinations of elements or devices are concerned, the several operative devices herein before described generally, may each and all be of any suitable kind, form or construction known to those skilled in the art, and capable of performing the functions thereof in the machine as a whole; and in respect to these generic features of our invention the required movements may be imparted to the several operative devices (which require to have movement) by any convenient driving or connecting mechanism which the skilled mechanic may choose to employ.

As certain features of our invention consist in certain novel constructions of certain of the operative devices and in the particular mode of combining the same together and in the construction of the mechanism for driving or imparting the required movements to the several parts or operative devices, we will now proceed to describe the machine more in detail. In describing these operative devices we will take them up in the order of their operation upon the blanks, and first as to the blank holder P and feeder mechanism R and S.

Referring more particularly to Figs. 2, 9, 14, 15, 16 and 17, it will be seen that the blank holder P consists of an inclined rack or box adapted to receive and hold the pile or stack X of blanks on their edges and in an inclined position. The lowermost corner of the pile of blanks rests upon a projecting lip $p$, and the opposite upper edge of the pile of blanks rests upon a projecting lip or ledge $p'$. The blank holder P is also furnished with a slotted safe-guard device or separator S, the slot $s$ of which is substantially equal in width to the thickness of the blank, so that only one blank can be lifted or slipped by the feeder R over the edge of the lip $p$ so as to disengage it from the pile of blanks. The lower edge X' of the pile of blanks X abuts against or rests upon the inclined side or guide bars P' of the holder P. The inclined side or guide bar P' is furnished with an adjustable section or member $P^2$ pivoted at $P^3$ and fixed in place by an adjusting screw $P^4$, so that its inclination may be adjusted or regulated as required to cause the pile of sheets to properly slip or feed down by gravity as one after another is removed from the bottom of the pile by the feeder R. The upper edge or face $X^2$ of the pile of blanks may abut against an inclined guide $P^5$, which is furnished with a projecting lip or ledge $p^2$ which serves to separate or divide the pile of blanks into two parts and thus relieve the feeding device R and separating device S from the pressure of the whole pile. This division of the pile into two parts is also of service in relieving the devices R and S from any extra strain or blows when the attendant or operator adds a package of new blanks to the pile already in the holder; and it also serves to indicate to the attendant when a new supply of blanks should be added. The blanks slip, one by one, or a very few at a time over the projecting lip or ledge $p^2$ as the blanks are fed by the feeder R, by reason of the double inclination that the guide or side P' has. In other words as soon as the blank slips a certain distance down the more inclined part $P^6$ of the guide P' the blank becomes too short to rest upon the lip or ledge $p^2$ and then of course drops from the upper part of the pile to the lower part thereof.

The feeder R consists of a block furnished with a shoulder $r$, which projects from the face of the feeder block about the thickness of one of the blanks, so as to engage the lowermost blank of the pile and shift or slip it upward into the slot $s$ of the safe guard or separator device S and thus disengage it from the lip $p$ of the holder P. The feeder has two movements, one a sliding or reciprocating movement to slip the blank into the slot $s$ of the separator S and disengage the lower edge of the blank from the lip $p$, and the other a swinging or lateral movement to permit the blank to drop down upon the conveyer or carrier M or adjusting device T. To provide for this double movement of the feeder it is mounted to slide in a pivoted or swinging guide R'.

The required sliding or reciprocating movement is imparted to the feeder by a cam $R^3$, connecting link $R^4$, lever or armed rock shaft $R^5$ and connecting link $R^6$. The required pivotal or swinging movement is communicated to the feeder R or its guide R' by means of an arm $R^7$ thereon, connecting link $R^8$, lever or armed rock shaft $R^9$, connecting link $R^{10}$ and cam $R^{11}$.

The separator or safeguard device S is preferably pivotally connected at $s'$, to cross bar $P^7$ of the holder, and furnished with a spring $s^2$, so that the slot of this safeguard may be kept in proper position in relation to the edge of the sheet in case the edge of the sheet should be buckled or out of a straight line.

Connected to the lever $R^5$ of the feeder R by an arm $r'$ and link $r^2$ and reciprocating in suitable guides on the cross bar $P^7$ is a slide S' which carries an extractor $S^2$ which serves to push the sheet out of the slot $s$ of the separator or safe guard device S, in case the blank should tend to stick therein. This extractor $S^2$ preferably has a yielding connection with the slide S', the same being effected by means of a spring $S^3$. The slide S' is also furnished with a shouldered lip or projection $S^4$ adapted to fit under the pile of blanks and serving in part to guide or support the same.

As the blanks are delivered one by one from the holder P by the feeder R, they fall upon or over the reciprocating carrier bars M by which the blanks are carried or conveyed to the paneling and edge trimming dies, thence to the edge folding or hook forming dies, and thence to the horn. But to adjust the blank transversely on the carrier M, a blank adjusting device T consisting preferably of a series of parallel revolving rollers, arranged parallel to and on a level with or slightly above the carrier bars M, is provided, and which serves to move the blank until its edge $x^3$ abuts against the gage or guide U. Any other equivalent form of blank adjusting device may of course be used in place of the horizontal set of rollers T, but we prefer to employ the rollers as a means of adjusting the sheet in position transversely on the carrier bars M, as the parallel rollers leave a free space between them for the coacting carrier bars M, and as they afford a broad platform to properly support the blank throughout its length. The construction of this adjusting device T will be readily understood by reference to Figs. 2, 3 and 12. Motion is communicated to the rollers, preferably, from the counter shaft T' through the bevel gears $T^2$, $T^3$, pulleys $T^4$ and belts $T^6$, and the intermeshing gears $T^7$ which connect the individual rollers. The blank conveyer bars M are, preferably, two in number, and reciprocate in suitable guides on the frame of the machine. The pawls $m$ of the carrier bars are best shown at Figs. 12, 28, 29, 30 and 31. They are adapted to engage the back edge of each blank and push it forward before them, and shut or close down within the carrier bar so as to ride under the next succeeding blank. The pawls $m$ are pivoted at $m'$ to the carrier bars M and N in recesses $m^2$ therein, and are held in position by springs $m^3$. Each pawl is furnished with a projecting lip $m^4$ which engages the wall of the recess $m^2$ and thus prevents the pawl from being thrown too far out by the spring $m^3$. The carrier bars M are secured to or carried by, or formed integral with, a reciprocating cross head or slide $M^2$ which moves back and forth in suitable guides $M^3$ on the frame and is operated from the main crank shaft W by a crank W' thereon, which actuates a reciprocating slide $M^4$ which slides in the slotted lever $M^5$, pivoted at $M^6$ to the frame of the machine, and to which is pivotally connected a link $M^7$ which operates a lever $M^8$ pivoted at $M^9$ to the frame and connected by a pivoted link $M^{10}$ with the cross head $M^2$.

To insure the pawl $m$ properly engaging the blank, we provide pusher bars $M^{11}$ which are held retracted by springs $M^{12}$ and which serve to push the blank slightly forward on the rollers T, so that pawls $m$ will be sure to be brought back of the back edge of the blank before the carrier M begins its forward movement. These pushers $M^{11}$ are pushed forward by the feeder bars M as they make their retracting movement by the pin or projection $m^5$ thereon engaging a lever $m^6$ pivoted to a bracket $m^7$ and the opposite end of which strikes against the spring pins or bars $M^{11}$.

By the forward movement of the carrier bars M the blank is pushed or conveyed forward into position between the edge trimming dies L L' and the paneling dies K K'; the blank at this time being smoothed and held down on the carrier bars M by the spring pressure guide bars V, which are supported on brackets or bridges V', (attached to the frame of the machine,) by means of adjustable bolts $V^2$ and springs $V^3$. The pressure bars V are furnished with longitudinal grooves or channels $v$ for the pawls $m$ of the carrier bars M.

The edge trimming dies L L' consist, preferably, of a pair of knives or dies affixed to the bed $L^2$, and a pair of movable knives or dies affixed to the vertical reciprocating cross head $L^3$. These trimming dies serve to square and straighten the edge of the blank and make the blank of the exact length to form the can body, so that the can bodies will all be of a uniform size, and so that the edges of the blank will properly register with the edge folding or hook forming dies at the succeeding step or operation. The paneling dies K K' likewise consist of a bed die secured to the bed $L^2$ and a movable die attached to the same cross head $L^3$ which carries the trimming die. The trimming and paneling dies are best shown at Figs. 7 and 11. The paneling dies are furnished with longitudinal grooves $k$ to receive the feed or carrier bars M, and with longitudinal grooves $k'$ to receive the pressure or guide bars V. The cross head $L^3$ which carries the movable paneling and trimming dies is operated from the crank shafts $L^4$ by means of the connecting links $L^5$. The links $L^5$ are made in two adjustable or screw connecting parts for purposes of adjustment. After the blank has thus been trimmed and paneled it is next moved forward by the second pair of pawls $m$ on the feeding bars M to the edge folding or hook forming dies G G' and H, H' $H^2$. These dies are best shown at Figs. 8, 11, 23, 24, and 25. The dies G G', which form a groove shaped hook or edge fold $x^2$, consist of a female die G secured to the bed $G^2$ and a male die G' secured to a movable cross head $G^3$. The bed $G^2$ and cross head $G^3$ are furnished with counterparts $G^5$ and $G^6$ of the paneling dies K K', so as to properly fit and support the paneled blank during the edge folding or hook forming operation, the same serving simply as holding or clamping plates for the blank. These holding or clamping plates $G^5$ $G^6$ are furnished with grooves $g$ $g'$ for the feeder bars M and presser bars V. The edge folder or hook forming die H, H', $H^2$, for the opposite edge of the blank, and which serves to make a fold shaped hook $x'$, as clearly shown in Fig. 24, consists in part of the die H, secured to the bed $G^2$, and furnished with a horizontal lip or ledge $h$ around which the edge of the sheet is folded to form the hook. It further comprises a movable folding die H' secured to the cross head G³ and which serves to make a substantially right angle bend at the edge of the blank. It further comprises a horizontal folder H², which is adapted to slide in suitable guides H³ on the cross head G³. The guide H³ along which the folder H² slides or reciprocates, is arranged with its guide face in an inclined position, so that the downward movement of the cross head G³ will serve to give the required inward or horizontal movement to this folder H², when the face or end $h'$ of the folder H² strikes against the stop $h^2$ secured to the bed G². The folder H² is held in its retracted position by a spring $h^3$; an adjusting screw $h^4$, carried by a bracket $h^5$, serves to limit the retracted movement of the folder H².

H⁴ is a guide for the edge of the blank to abut against, it is mounted yieldingly on suitable guides or pins H⁵ attached to the bed plate G², and it is held in position by a spring H⁶. As the cross head G³ descends this guide H⁴ is pushed down out of the way by the folder H² striking against the same. The cross head G³ is operated by suitable cranks G⁷ on the crank shafts L⁴, the same being connected with the cross head G³ by the pivoted links G⁸. After the edge folds or hooks $x'$ $x^2$ have thus been formed in the blank it is moved forward by the third pair of pawls $m$ on the feeder bars M into position over the horn B, the edge of the blank at this time abutting against and being guided by the side guides Y Y and supported by the horizontal or movable guides D D which are adapted to reciprocate transversely in suitable guides D' on the frame of the machine. These guides D are preferably held in position to support the edge of the sheet by springs D², adjusting screws D³ being provided to regulate the tension of the springs. The movable guides D are, preferably, retracted, (to permit the blank to be folded downward around the horn by the folder C,) by means of vertically reciprocating bars or wedges D⁴, which pass through slots $d$ in the guides D and which are furnished with inclines or projections $d'$ to engage the guides D. These bars or wedges D⁴ are, preferably, secured to and operated by the same cross head C³ which actuates the folder C.

The horn B is of square form, as the can bodies designed to be formed by this particular machine are square in cross section, but the shape of the horn will of course conform to the shape of the can body desired to be made. The horn is, preferably, of skeleton form so that it may chiefly support the can body at the four corners thereof. The construction of the horn and the machine for folding the can body blank around the horn, is shown in Figs. 1, 4, 5, 6, 9, 10, 13, 18, 19, 20, 21 and 22.

The horn B preferably has two fixed corners or die pieces $b$ $b$ of steel at its side corners, and two movable opening and closing or expansible corners $b'$ $b'$, the same being opened and closed by a slide $b^2$ connected therewith by pivoted links $b^3$. The slide $b^2$ is reciprocated in the horn so as to open and close the movable portions $b'$ $b'$ of the horn by means of a crank arm $b^4$ on the rock shaft $b^5$, and which crank arm is connected by a pivoted link $b^6$ with the slide $b^2$. The movable portions $b'$ $b'$ of the horn are forced apart or expanded after the blank $x$ has been folded around the horn and its hooks $x'$ $x^2$ brought into position for interlocking. The expanding movement of these portions of the horn serves to bring the hooks into register with each other and to properly support the seam while it is being squeezed by the bumper E; and the contracting movement of such portions $b'$ $b'$ of the horn serves to loosen the formed can body on the horn so that the carrier bars N may readily push the can body lengthwise off the horn.

The horn B is further preferably provided with movable or hinged wings or leaves B' B', pivoted at B² to the upper corner of the horn and adapted to be closed down against the periphery of the horn by the blank as it is folded around the horn. These pivoted wings or leaves are normally held up in the position, as indicated in Figs. 5 and 6, by light springs B³ surrounding the pivoted stems B⁴. These yielding or spring supported wings or leaves serve to partially sustain the blank and in a measure to smooth it out as it is being carried downward around the horn by the folder C. When the folder C has been retracted these spring leaves also serve, in a measure, to loosen the can body on the horn, and to prevent any tendency of its sticking thereon. The horn B is secured rigidly at one end to the frame of the machine.

The folder C is preferably furnished with two hinged arms C' C² adapted to close together around the horn. The folder C is carried by or secured to a vertically reciprocating cross head C³. The pivoted or hinged arms C' C² of the folder are pivoted to the folder by pivots $c$ which register with the side corners $b$ of the horn when the arms C' C² are closed around the horn. The arms C' C² are each preferably made in two sections or parts, jointed or clamped together by a yielding or spring held clamp or joint $c^2$ $c^3$, bolt $c^4$ and spring $c^5$. The purpose of this is to relieve the arms C' C² and the connecting mechanism of undue strain in case of accident, and compensate for inequalities or differences in thickness of the stock from which the blanks are cut. The horn B is further provided with slots, grooves or openings $b^{12}$ for the carrier bars N N to reciprocate in. These slots or ways for the carrier bars are preferably located at the lower half of the periphery of the horn. The folder C is further provided with a clamping bar C⁴, the under face C⁵ of which conforms to the upper corner of the horn. This clamping bar is independently movable on the former C or its cross head, so that this clamp bar may come down first and clamp and hold the blank at its middle against the upper part of the horn before and while it is being folded downward around the horn by the former or folder C. The clamp bar $C^4$ is also so timed in respect to the movable guides D D for the edges of the blank, that it will clamp the blank at its middle before the guides D D are withdrawn. The blank is thus always adequately held in position over the horn, either by the side guides D or the clamp bar $C^4$, one or both. The movable arms $C'$ $C^2$ of the folder are closed about the horn, (the arm $C'$ being so timed as to close slightly before the arm $C^2$, so that the hook $x'$ will come to place first and underneath, and the hook $x^2$ last and overlapping the hook $x'$,) by means of the vertically reciprocating racks $C^{26}$, meshing with the loose gears $C^6$, which gear carries a pin $C^7$ that engages a gear or disk $C^8$ fast upon the shaft $C^9$, which constitutes the pivot of the swinging arm $C'$ or $C^2$. These swinging arms $C'$ $C^2$ are retracted by spring actuated racks $C^{10}$ which engage the teeth of the gear $C^8$. The spring $C^{11}$ for actuating the racks $C^{10}$ is inclosed in the guide $C^{12}$ for the rack $C^{10}$.

$C^{13}$ is a supplemental spring barrel connected by a chain $C^{14}$ to the arm $C'$ or $C^2$ to assist in, or better insure, the proper retraction of these arms.

To prevent danger of breakage or undue strain of the parts by accidents or undue thickness of or irregularities in the blanks, the racks $C^{26}$ are held in place or engagement with the gears $C^6$ by spring-held cap plates $C^{15}$, which are attached to the guide $C^{16}$ of these racks. $C^{17}$ are the springs for holding these caps in place. The cross head $C^3$ is actuated by cranks $C^{17}$ $C^{17}$ on the crank shafts $L^4$, which operate the cross-heads that carry the trimming, paneling and edge folding dies. The crank shafts $L^4$ are operated from the main crank shaft W by a crank $W^2$ thereon, which is connected by a link $W^3$, pivoted at its lower end to a supplemental cross head Z having bearings in the cross head $C^3$, and which cross head Z is connected by links $Z'$ with the crank $C^{17}$.

The rack bars $C^{26}$ are operated by the cross-head Z to which they are attached. The links $Z'$ are so arranged in respect to the crank arms $C^{17}$ and the cross head Z as to permit the cross head Z and the rack bars $C^{26}$ carried thereby to have a further downward movement after the cross head $C^3$ and the folder C carried thereby reach home; thus causing the arms $C'$ $C^2$ of the folder to close about the horn after the folder C stops its downward movement. This further movement is permitted as the link $Z'$ passes its dead center. This also causes the arm $C'$ $C^2$ to first open at the withdrawing movement of the cross heads.

The clamp bar $C^4$ is operated, as before described, by means of a pair of levers or rock shafts $C^{20}$, connected by links $C^{21}$ with said clamp bar, and connected together by a pivoted link $C^{22}$, and one of which is operated by a cam $C^{23}$ on the main crank shaft W, lever $C^{24}$, and link $C^{25}$.
The bumper E is secured to a cross head $E'$ and is reciprocated vertically in suitable guides $E^2$ on the frame by means of a connecting link $E^3$, rock shaft $E^4$, connecting link $E^5$, lever $E^6$ and cam $E^7$ on the main crank shaft W.

The carrier bars M N are secured to the same slide or cross head $M^2$.

The guide F is secured to the stationary frame of the machine and serves, as before stated, to guide the edge of blank as it is lapped around the horn.

The rock shaft $b^5$ for expanding the horn receives motion from the main crank shaft W by the lever $b^7$, cams $b^8$ $b^9$, link $b^{10}$ and lever $b^{11}$.

The carriers M and N are adjustable in the cross head, by the adjusting screws $n$.

The blank supporter D or rather its guide $D'$ is furnished with an adjusting screw $d^2$ for the sheet to abut against.

We claim—

1. In a can body forming machine, the combination of the horn around which the can body is formed and its side seam interlocked and a device for carrying or conveying the blanks to the horn, of dies or devices for trimming the edge of the blank, substantially as specified.

2. In a can body forming machine, the combination of the horn around which the can body is formed and its side seam interlocked and a blank carrier, with a pair of paneling dies for forming the required panels in the sides of the can body, substantially as specified.

3. In a can body forming machine, the combination with the horn, a carrier for conveying the blanks to the horn, mounted on the frame of the machine of a holder adapted to contain a pile of blanks, and a feeder for feeding or delivering the blanks one by one from the pile to said blank carrier, substantially as specified.

4. In a can body forming machine, the combination of a horn, a device for folding the blank around the horn, edge folding or hook forming dies or devices, paneling dies or devices, and a reciprocating blank carrier adapted to convey the blanks to the paneling dies, to the edge folding dies or devices to the horn, and to discharge the formed can body from the horn, substantially as specified.

5. In a can body forming machine, the combination of a horn, a device for folding the blank around the horn, edge folding or hook forming dies or devices, paneling devices, and a reciprocating blank carrier adapted to convey the blanks to the paneling dies, to the edge folding dies or devices to the horn, and to discharge the formed can body from the horn, said carrier having one set of bars M reciprocating in guides above the horn, and one set of bars N extending through the horn, substantially as specified.

6. In a can body forming machine, the combination with a blank holder P, of a feeder R, a blank adjusting device T, adapted to receive the blank as it is delivered from the feeder, a gage U, a blank carrier and a horn, substantially as specified.

7. In a can body forming machine, the combination with a horn, a blank carrier for carrying the blanks to the horn, a blank holder and feeder, a gage, and a device for adjusting the position of the blanks in respect to said carrier as they are delivered from said feeder, substantially as specified.

8. In a can body forming machine, the combination with a horn of a reciprocating blank carrier M furnished with pawls $m$, a device for feeding or delivering the blanks thereto one by one, and a pusher device $M^{11}$ for pushing the blank forward to insure the pawls engaging it, substantially as specified.

9. In a can body forming machine, the combination with a horn, of a reciprocating blank carrier M furnished with pawls $m$, a device for feeding or delivering the blanks thereto one by one, and a pusher device $M^{11}$ for pushing the blank forward to insure the pawl engaging it, said pushing device being furnished with a spring for holding it normally retracted, and mechanism connecting pusher $M^{11}$ with said carrier whereby it is actuated by the return movement of the carrier, substantially as specified.

10. In a can body forming machine, the combination of a horn, dies or devices shaped and adapted for forming a groove-shaped hook $x^2$ at one edge of the blank, and other distinct dies or devices shaped and adapted for forming a fold-shaped hook $x'$ at the opposite edge of the blank, and a folder for bending the blank around the horn and causing the latter hook to overlap and engage the former hook, substantially as specified.

11. In a can body forming machine, the combination of a horn, dies or devices shaped and adapted for forming a grooved hook $x^2$ at one edge of the blank, and other distinct dies or devices shaped and adapted for forming a fold-shaped hook $x'$ at the opposite edge of the blank, and a folder for bending the blank around the horn and causing the latter hook to overlap and engage the former hook, and a device for closing the seam against the horn, substantially as specified.

12. In a can body forming machine, the combination with a horn and a carrier for conveying the blanks to the horn, of a holder P for the pile of blanks, and a feeder R provided with shoulder $r$ adapted to engage the lowermost blank only of the pile, said feeder R being separate from said carrier substantially as specified.

13. In a can body forming machine, the combination with a horn, of reciprocating blank carrier bar M for conveying the blank to the horn, and bars V extending above and parallel to the carrier bars M for guiding the blank, substantially as specified.

14. In a can body forming machine, the combination with a horn, of reciprocating blank carrier bar M for conveying the blank to the horn, and a bar V extending above and parallel to the carrier bar M for guiding the blank, said guide bars V having spring or yielding supports, substantially as specified.

15. In a can body forming machine, the combination with a horn, of reciprocating blank carrier bar M for conveying the blank to the horn, and a bar V extending above and parallel to the carrier bar M for guiding the blank, said carrier bar M being furnished with pawl $m$, and said guide bar V having groove $v$ to receive said pawl, substantially as specified.

16. In a can body forming machine, the combination with a horn, edge folding or hook forming dies or devices, paneling and edge trimming dies, blank carrier bars M and pressure or guide bars V, substantially as specified.

17. In a can body forming machine, the combination with blank carrier bars M, of paneling dies having grooves to receive said carrier bars, substantially as specified.

18. In a can body forming machine, the combination with a horn, of blank carrier bars M, edge folding dies or devices, and blank holder plates $G^5$ $G^6$, one furnished with grooves to receive said carrier bars M, substantially as specified.

19. In a can body forming machine, the combination with a horn, blank carrier bars M, pressure bars V, and paneling dies furnished with grooves to receive said bars M, V, substantially as specified.

20. In a can body forming machine, the combination with horn B, furnished with movable corner pieces $b'$ $b'$, of mechanism for folding the blank around the horn, and mechanism for squeezing or compressing the edge folds of the blank into a seam, substantially as specified.

21. The horn B furnished with movable parts $b'$ $b'$, in combination with a slide $b^2$ and connecting links $b^3$, in combination with mechanism for folding the blank around the horn, substantially as specified.

22. The can body former horn B provided with movable wings or leaves $B'$ $B'$, having yielding or spring supports, in combination with mechanism for folding the blank around the horn, said wings or leaves operating to partially support the two ends of the blank as they are being lapped around the horn substantially as specified.

23. The can body former horn B provided with movable wings or leaves $B'$ $B'$, having yielding or spring supports, in combination with a folder or former C, said wings or leaves opening outward beyond the normal periphery of the horn to support the ends of the blank as it is being folded around the horn by said folder or former C substantially as specified.

24. The combination with a horn of a folder C adapted to surround half of the horn, and provided with hinged arms C' C² adapted to close about the remainder of the horn, said hinged arms being made in two parts jointed or clamped together by a yielding or spring clamp, substantially as specified.

25. The combination with a can body former horn, of a reciprocating former or folder C, an independently reciprocating clamp bar C⁴ adapted to clamp the blank at its middle against the horn, means for reciprocating said former or folder C, and a separate independent mechanism for reciprocating said clamp bar C⁴ substantially as specified.

26. The combination with a can body former horn, of a reciprocating former or folder C, an independently reciprocating clamp bar C⁴ adapted to clamp the blank at its middle against the horn, and movable guides D D, and means for operating said folder C, clamp bar C⁴ and movable bars D D, said movable guides D D being withdrawn thereby after the clamp bar C⁴ clamps the blank, substantially as specified.

27. The combination with a can body former horn, blank carrier bars M, a gage U and a blank adjusting device T consisting of a series of rollers, substantially as specified.

28. The combination with a can body former horn, blank carrier bars M, a gage U and a blank adjusting device T consisting of a series of rollers, holder P, blank feeder R and slotted safe guard or separator device S, substantially as specified.

29. In a can body forming machine, the combination with a blank holder P, adapted to receive and hold a stack or pile of blanks on their edges and in an inclined position, provided with a projecting lip $p$ to support the lowermost edge or corner of the pile of blanks, and a projecting lip $p'$ upon which the opposite upper edge of the pile of blanks rests, of a feeder R arranged and adapted to engage the lowermost blank, a slotted separator S arranged adjacent to said lip $p'$, said holder P being provided with a second lip $p^2$ at its upper end to divide the pile of blanks into two parts and relieve said lip $p'$ from the pressure of the upper part of the pile of blanks, substantially as specified.

30. In a can body forming machine, the combination with a blank holder P, adapted to receive and hold a stack or pile of blanks on their edges and in an inclined position, provided with a projecting lip $p$ to support the lowermost edge or corner of the pile of blanks, and a projecting lip $p'$ upon which the opposite upper edge of the pile of blanks rests, of a feeder R arranged and adapted to engage the lowermost blank, a slotted separator S arranged ajacent to said lip $p'$, said holder P being provided with a second lip $p^2$ at its upper end to divide the pile of blanks into two parts and relieve said lip $p'$ from the pressure of the upper part of the pile of blanks, said holder P having a lower side or guide bar P' which is provided with a double incline P² P⁶, substantially as specified.

31. The blank holder P, in combination with feeder R and slotted separator S, the side or guide P' of said holder against which the blanks rest on their edges having an adjustable part or section P², substantially as specified.

32. The combination with a blank holder P of feeder R, slotted separator S, and a blank pusher or extractor S², substantially as specified.

33. The combination with a blank holder P of feeder R, slotted separator S, and a movable blank pusher or extractor S², said extractor S² being connected to a slide S', substantially as specified.

34. The combination with a blank holder P of feeder R, slotted separator S, and a movable blank pusher or extractor S², said extractor S² being connected to a slide S', said slide S' being provided with a lip S⁴, substantially as specified.

35. The combination with blank holder P, having lips $p$ $p'$, reciprocating pivotal feeder R furnished with shoulder $r$, slotted separator S, hinged guide R' carrying the sliding feeder R, mechanism for swinging said guide R' on its pivot, and mechanism for reciprocating said feeder R on said pivoted guide R', substantially as specified.

36. The combination with blank holder P, having lips $p$ $p'$, reciprocating pivotal feeder R furnished with shoulder $r$, slotted separator S, hinged guide R' carrying the sliding feeder R, mechanism for swinging said guide R' on its pivot, and mechanism for reciprocating said feeder R on said pivoted guide R', extractor S², slide S' and means for operating said slide S', substantially as specified.

37. In a can body forming machine, the combination with the bed G² and reciprocating cross head G³, of a set of hook forming dies G G' arranged and adapted to form a hook at one edge of the blank, and another set of hook forming dies H H' H² arranged and adapted to form a hook at the opposite edge of the blank, said dies G and H being rigidly secured to said stationary bed G² and said dies G' and H' H² being carried by the reciprocating cross head G³, substantially as specified.

38. In a can body forming machine, the combination with the bed G² and a reciprocating cross head G³, of hook forming dies G G' and H, H', H², said die or folder H² reciprocating in an inclined guide secured to said cross head to adapt the same to be given an inward movement to complete the formation of one of the hooks by impinging against said bed or a stop thereon, substantially as specified.

39. In a can body forming machine, the combination with the bed G² and a reciprocating cross head G³, of hook forming dies G G' and H, H', H², said die or folder H² reciprocating in an inclined guide secured to said cross head to adapt the same to be given an inward movement to complete the formation of one of the hooks by impinging against said bed or a stop thereon, and a spring for holding said die or folder $H^2$ retracted, substantially as specified.

40. In a can body forming machine, the combination with the bed $G^2$ and a reciprocating cross head $G^3$, of hook forming dies G G′, and H, H′, $H^2$, said die or folder $H^2$ reciprocating in an inclined guide secured to said cross head to adapt the same to be given an inward movement to complete the formation of one of the hooks by impinging against said bed, or a stop thereon, and a guide $H^4$ having a spring or yielding support and adapted to be pushed out of the way by the descent of said cross head and the devices carried thereby, substantially as specified.

41. The combination with a bed and cross head of a hook forming die composed of the parts H, H′ and $H^2$, said die H being rigidly secured to the bed, said die H′ being rigidly secured to the cross head and said die $H^2$ being mounted movably on the cross head and having a sliding movement in an inclined direction on said cross head substantially as specified.

42. The combination of a bed and cross head of dies or folders H, H′, $H^2$ and guide $H^4$, said folder $H^2$ having a sliding movement in an inclined direction on said cross head and being operated by impinging against the bed, substantially as specified.

43. In a can body forming machine, the combination of a horn with a folder C furnished with hinged arms C′ $C^2$, a cross head for operating said folder, and gears and sliding racks for operating said hinged arms, substantially as specified.

44. In a can body forming machine, the combination of a horn with a folder C furnished with hinged arms C′ $C^2$, a cross head for operating said folder, gears and sliding racks for operating said hinged arms, and springs for retracting said hinged arms, substantially as specified.

45. In a can body forming machine, the combination of a horn, with a folder, a cross head for operating the folder, movable guides D D for supporting the edge of the blank over the horn, and reciprocating bars or wedges $D^4$ $D^4$ connected with said cross head for operating said guides D D, substantially as specified.

46. In a can body forming machine, the combination of a horn, with a folder, a cross head for operating the folder, movable guides D D for supporting the edge of the blank over the horn, and reciprocating bars or wedges $D^4$ $D^4$ connected with said cross head for operating said guides D D, and clamp bar $C^4$ mounted in the folder and adapted to clamp the blank against the middle portion of the horn and means for operating the same, substantially as specified.

47. In a can body forming machine, the combination with a blank holder P of a blank feeder R for delivering the blanks one by one from said holder, a blank carrier M and a blank adjusting device T arranged and adapted to receive the blanks from said feeder and adjust them in respect to said carrier as they are delivered from said feeder, said adjusting device consisting of revolving rollers arranged parallel to the carrier M, and means for revolving said rollers comprising shaft T′, gears $T^2$ $T^3$, pulleys $T^4$, belts $T^6$ and intermeshing gear $T^7$, substantially as specified.

48. The combination with a can body forming horn of a folder C having hinged arms C′ $C^2$, cross head $C^3$ for operating said folder C, supplemental cross head Z, mechanism connecting said cross head Z with said hinged arms C′ $C^2$ for operating the same, and cranks and connecting links for communicating motion to said cross heads arranged and combined substantially as shown and described whereby said cross head Z is given a further movement after the cross head $C^3$ reaches the lower limit of its movement, substantially as specified.

Dated August 24, 1892.

F. M. LEAVITT.
    JOHN G. HODGSON.

Witnesses to the signature of Frank M. Leavitt:
  DENNIS JUDGE,
  HOWARD C. SEAMAN.

Witnesses to the signature of John G. Hodgson:
  H. M. MUNDAY,
  EDW. S. EVARTS.